(12) United States Patent
Matsuda et al.

(10) Patent No.: US 8,127,320 B2
(45) Date of Patent: Feb. 28, 2012

(54) THREAD MOTOR AND PLAYBACK DEVICE

(75) Inventors: Mikinori Matsuda, Kanagawa (JP);
Kurita Kazuhito, Kanagawa (JP)

(73) Assignee: Sony Corporation, Tokyo (JP)

( * ) Notice: Subject to any disclaimer, the term of this patent is extended or adjusted under 35 U.S.C. 154(b) by 1125 days.

(21) Appl. No.: 11/986,282

(22) Filed: Nov. 20, 2007

(65) Prior Publication Data

US 2008/0127239 A1 May 29, 2008

(30) Foreign Application Priority Data

Nov. 27, 2006 (JP) .................................. 2006-317906

(51) Int. Cl.
*G11B 17/04* (2006.01)
(52) U.S. Cl. ........................................................ 720/664
(58) Field of Classification Search .................. 720/663, 720/664, 676
See application file for complete search history.

(56) References Cited

U.S. PATENT DOCUMENTS

| 7,342,744 | B2 * | 3/2008 | Matsuda et al. | ........... | 360/99.06 |
| 7,533,394 | B2 * | 5/2009 | Yamada et al. | ................ | 720/640 |
| 2005/0251816 | A1 * | 11/2005 | Matsuda et al. | .............. | 720/636 |
| 2005/0251817 | A1 * | 11/2005 | Yamada et al. | ................ | 720/640 |

FOREIGN PATENT DOCUMENTS

| JP | 04-148005 | A | 5/1992 |
| JP | 5-036646 | U | 5/1993 |
| JP | 05-225662 | A | 9/1993 |
| JP | 5-314747 | A | 11/1993 |
| JP | 6-084048 | U | 12/1994 |
| JP | 07-006939 | U | 1/1995 |
| JP | 07-296468 | A | 11/1995 |
| JP | 11-243657 | A | 9/1999 |
| JP | 11-273276 | A | 10/1999 |
| JP | 2002-042442 | A | 2/2002 |
| JP | 2003-035879 | A | 2/2003 |
| JP | 2003-168281 | A | 6/2003 |
| JP | 2003-264954 | A | 9/2003 |
| JP | 2003-339132 | A | 11/2003 |
| JP | 2004-153945 | A | 5/2004 |
| JP | 2004-254455 | A | 9/2004 |
| JP | 2004-270728 | A | 9/2004 |
| JP | 2005-322318 | A | 11/2005 |
| JP | 2006-172554 | A | 6/2006 |
| JP | 2006-277940 | A | 10/2006 |

* cited by examiner

*Primary Examiner* — Will J Klimowicz
(74) *Attorney, Agent, or Firm* — Wolf, Greenfield & Sacks, P.C.

(57) ABSTRACT

A thread motor is disclosed. The thread motor includes: a cylindrical rotor; a ring-shaped gear provided at an outer peripheral surface of the cylindrical rotor; and a flange portion provided at the outer peripheral surface of the cylindrical rotor, opposed to the gear with a predetermined clearance.

8 Claims, 28 Drawing Sheets

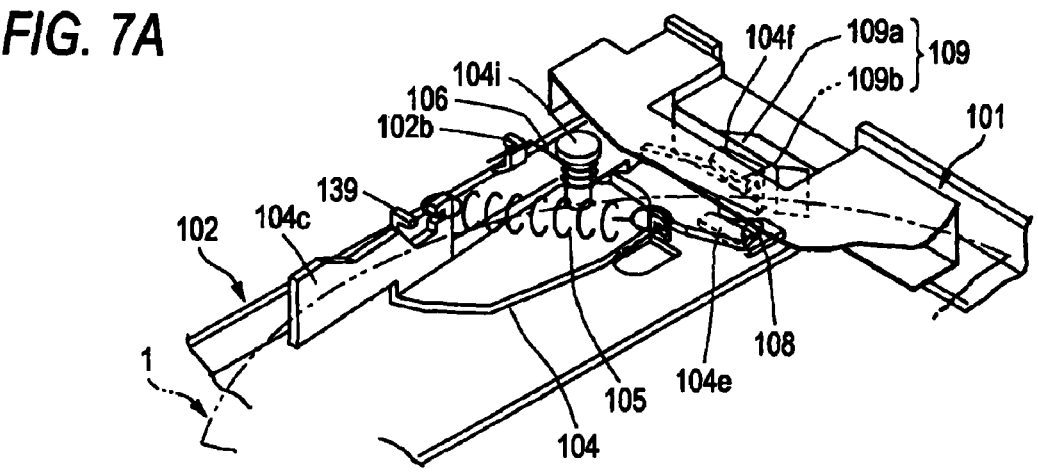
FIG. 7A
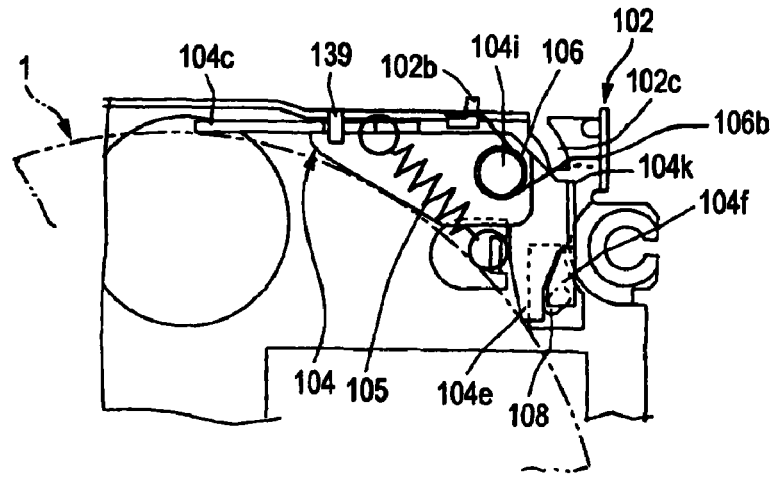
FIG. 7B
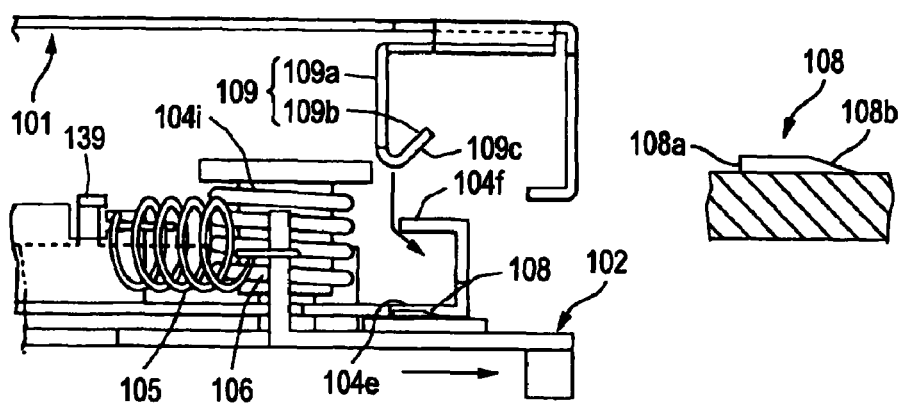
FIG. 7C
FIG. 7D

US 8,127,320 B2

THREAD MOTOR AND PLAYBACK DEVICE

CROSS REFERENCE TO RELATED APPLICATIONS

The present invention contains subject matter related to Japanese Patent Application JP 2006-317906 filed in the Japanese Patent Office on Nov. 27, 2006, the entire contents of which being incorporated herein by reference.

BACKGROUND OF THE INVENTION

1. Field of the Invention

A playback device including a spindle motor rotating a disc-type recording medium, an optical pickup performing playback of information of the disc-type recording medium and a thread motor moving the optical pickup in a radial direction of the disc-type recording medium is known.

2. Description of Related Art

As shown in FIG. 34 and FIG. 35, a thread motor 301 is attached to a stator substrate 302 as a motor supporting plate in a pendent state under a chassis 303 by means of a screw 304, an adhesive and the like so that an outer peripheral portion of the stator substrate 302 is overlapped with an undersurface of the chassis 303. A first gear 307 included in a transmission gear group 306 transmitting the rotation of a rotor 305 to the optical pickup is provided at an undersurface of the rotor 305 of the thread motor 301. The transmission gear group 306 includes a first gear 307, a second gear 308 engaged with the first gear 307, a first worm gear 309 integrally formed with the second gear 308 and a second worm gear 310 engaged with the first worm gear 309. The second worm gear 310 is fixed to a lead screw 311, and the rotation of the rotor 305 of the thread motor 301 is transmitted to the lead screw 311 through the transmission gear group 306 to rotate the lead screw 311, thereby driving the optical pickup (now shown).

As described above, the thread motor 301 is attached under the chassis 303 in a pendent state under the chassis 303 by means of the screw 304 and the like so that the outer peripheral portion of the stator substrate 302 is overlapped with the undersurface of the chassis 303, therefore, in the case that the screw 304 and the like are loosened due to vibration or shock, there is a fear that the thread motor 301 may fall from the undersurface of the chassis 303.

A playback device including a motor falling prevention portion 321 has been developing, which prevents further movement of the thread motor 301 when the thread motor 301 moves in a falling direction away from the chassis 303. The motor falling prevention portion 321 is formed in an approximately L-shape by a vertical piece portion 322 formed approximately vertically along an outer peripheral surface of the rotor 305 of the thread motor 301 at the undersurface side of the chassis 303 and a horizontal piece portion 323 formed by folding a tip portion of the vertical piece portion 322 at approximately right angles toward the center of the thread motor 301. A tip portion of the horizontal piece portion 323 overlaps the undersurface of the thread motor 301 slightly. When an amount of overlapping of the horizontal piece portion 323 is large, the falling prevention effect increases, however, the overlapping amount will be an obstacle when attaching the thread motor 301 to the chassis 303, therefore, the length of the horizontal piece portion 323 is determined in consideration of the circumstances. (For example, refer to JP-A-2005-322318 (Patent Document 1)).

SUMMARY OF THE INVENTION

There were problems in the playback device in the past as described below.

(1) Since the first gear 307 is provided at the undersurface of the rotor 305 of the thread motor 301, the thickness of the thread motor 301 becomes thick for the thickness of the first gear 307.

(2) It is necessary to take the large amount of overlapping of the horizontal piece portion 323 with respect to the undersurface of the rotor 305 for making the falling prevention effect of the thread motor 301 by the motor falling prevention portion 321 reliable, however, when the large amount of overlapping of the horizontal piece portion 323 is taken, there is a fear that the tip of the horizontal piece portion 323 may be engaged with the first gear 307. In order to eliminate the fear, it is necessary to reduce a diameter of the first gear 307.

Thus, it is desirable to provide a playback device in which the thread motor does not become thick even by the existence of the gear provided at the rotor of the thread motor as well as the large amount of overlapping can be taken between the thread motor and the mother falling prevention portion without reducing the diameter of the gear.

According to an embodiment of the invention, there is provided a playback device including a chassis, a thread motor provided at the chassis, a transmission gear group transmitting power of the thread motor to a playback portion and a motor falling prevention portion provided at the chassis for preventing the thread motor from falling from the chassis, in which a first gear and a flange portion are arranged at an outer peripheral surface of a cylindrical rotor of the tread motor so as to be opposed to each other with a predetermined clearance and a tip portion of the motor falling prevention portion is inserted to the clearance between the first gear and the flange portion.

When the thread motor fixed to the chassis moves in the falling direction away from the chassis, the tip portion of the motor falling prevention portion touches the flange portion to prevent the thread motor from moving further in the falling direction, which prevents the thread motor from falling.

Particularly, since the first gear is provided at the outer peripheral surface of the cylindrical portion of the rotor of the thread motor, the thickness of the first gear is absorbed in the thickness of the rotor, which allows the thickness of the thread motor to be thinner than the case in which the gear is provided at the undersurface of the rotor as in related arts.

BRIEF DESCRIPTION OF THE DRAWINGS

FIG. 7A is a perspective view of the eject lever portion showing a state in which the lever is locked, FIG. 7B is a plan view of the same, FIG. 7C is a side view of the same and FIG. 7D is a cross-sectional view of an eject lever locking portion;

DESCRIPTION OF THE PREFERRED EMBODIMENTS

Hereinafter, embodiments of the invention will be described in the order of (1) schematic configuration of the whole playback device, (2) configuration of a thread motor, (3) configuration of a motor falling prevention portion, (4) configuration of a transmission gear group, (5) configuration of a spindle motor, (6) configuration of an optical pickup, (7) configuration of a cartridge eject mechanism, (8) configuration of a eject lever locking release portion, (9) configuration of a cartridge, (10) configuration of a cartridge holder, (11) configuration of a chassis, (12) operation and effect and (13) other embodiments.

(1) Schematic Configuration of the Whole Playback Device

Figure 1:
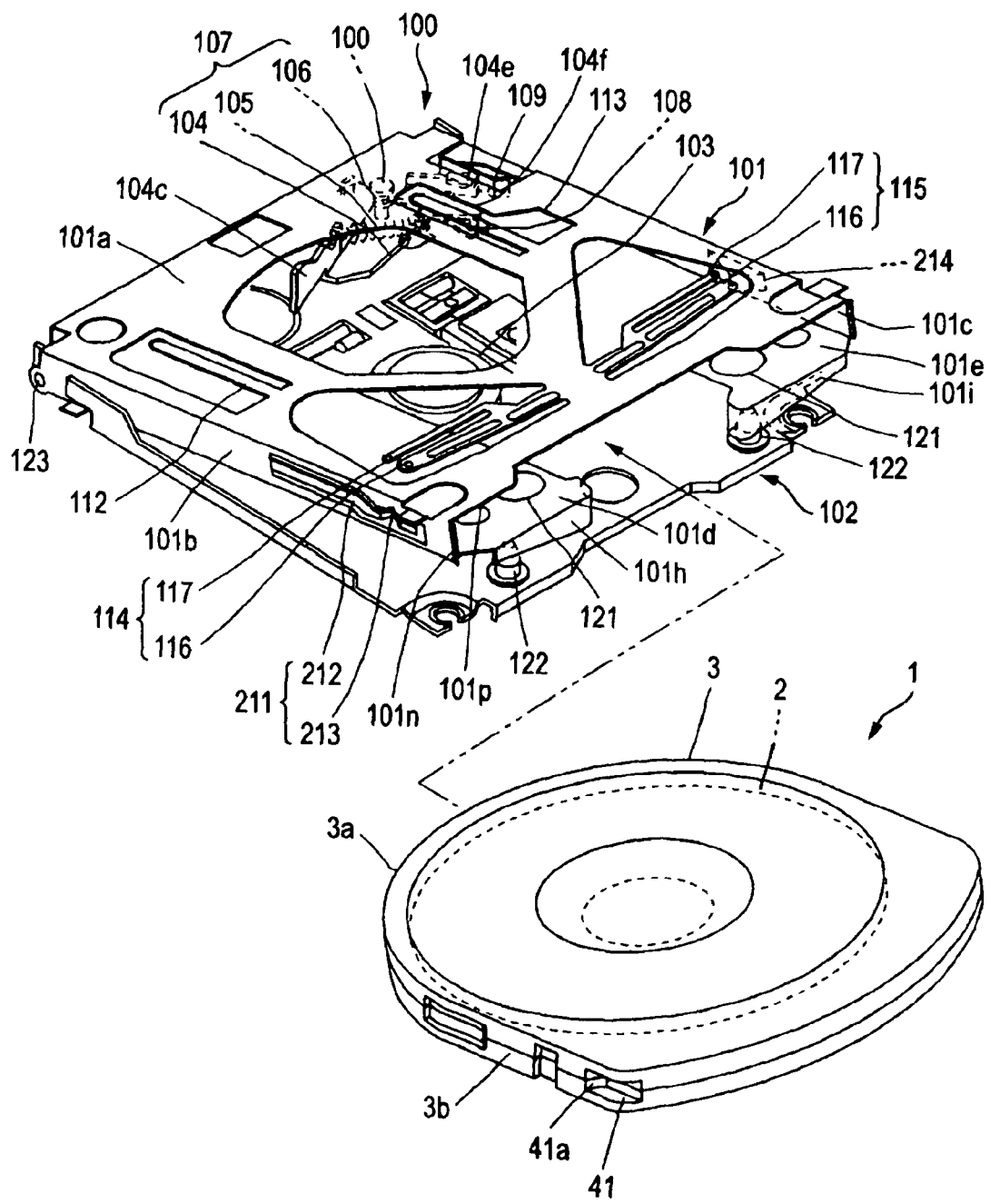
FIG. 1 is a perspective view of a playback device in which a holder is in an insertion/ejection position.
Figure 2:
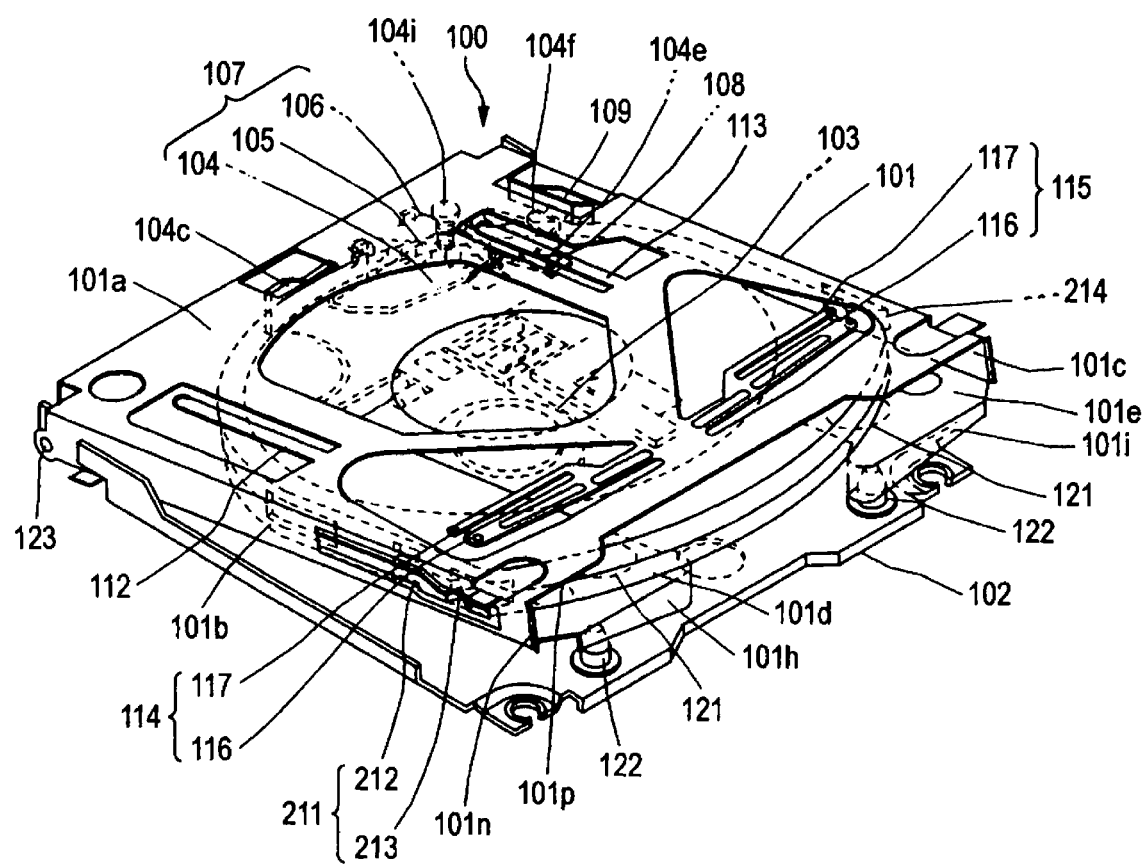
FIG. 2 is a perspective view of the playback device in which a cartridge is inserted in the holder.
Figure 3:
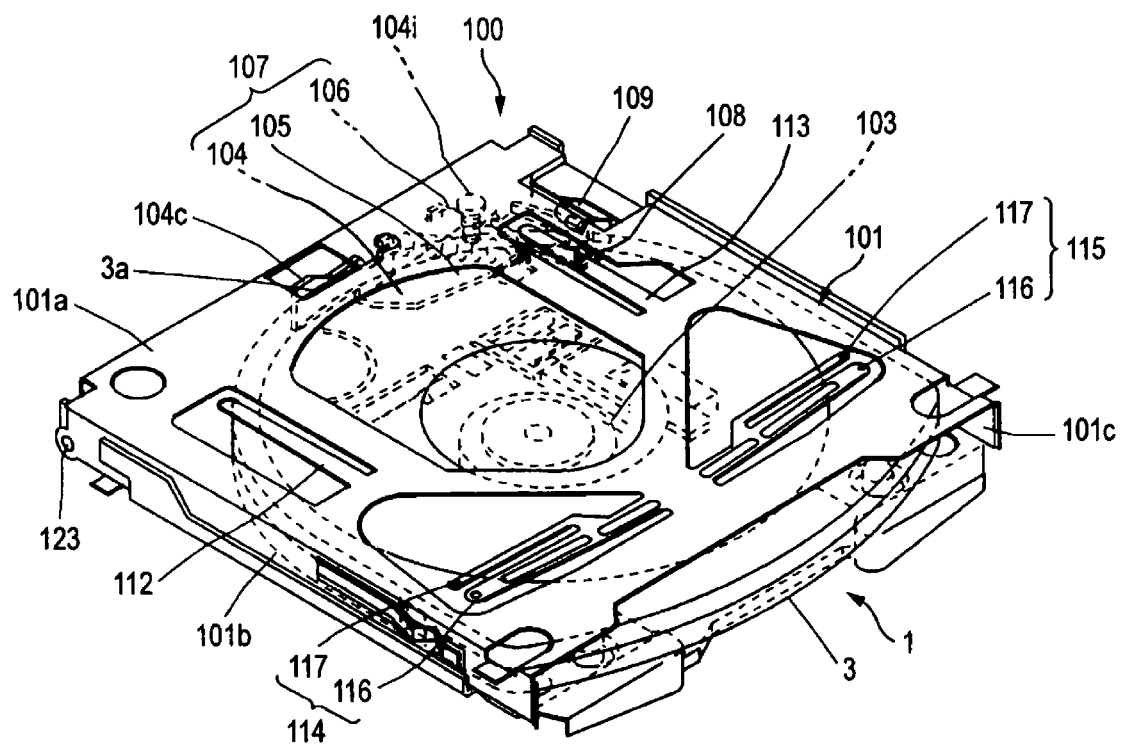
FIG. 3 is a perspective view of the playback device in which the holder is in a recording/playback position.
Figure 4:
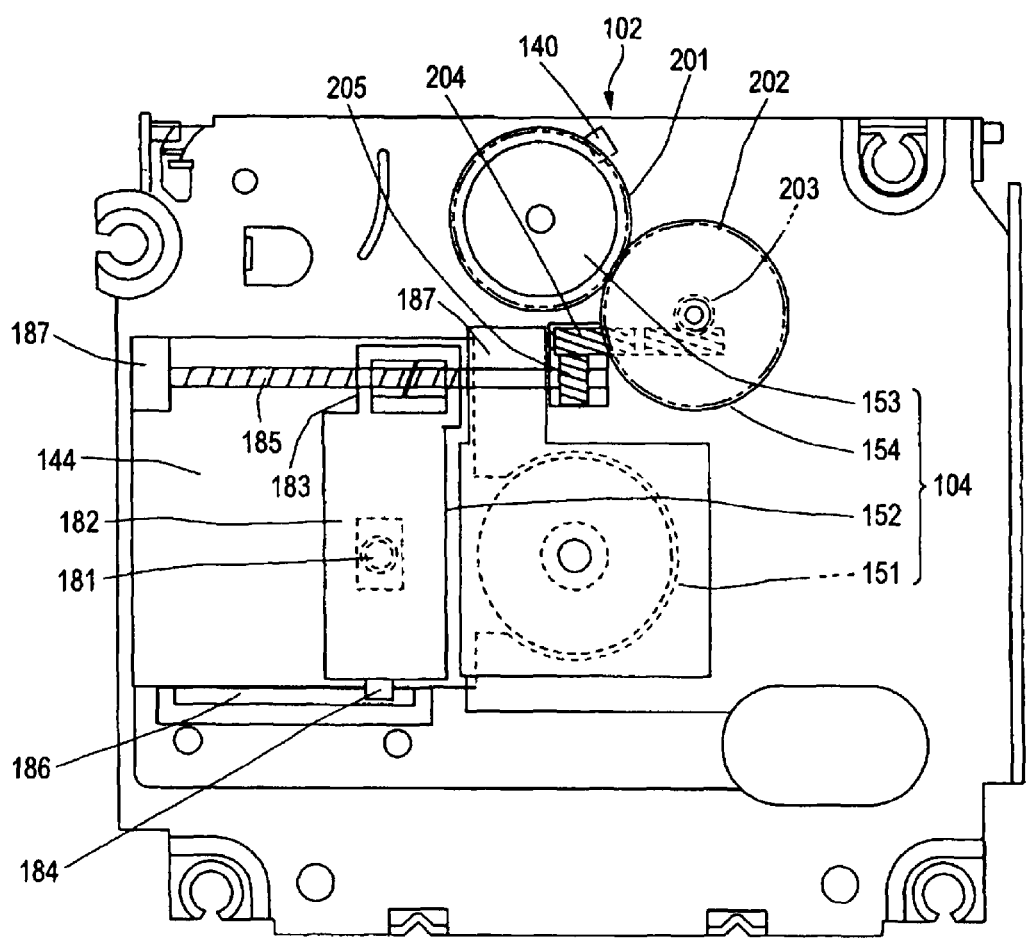
FIG. 4 is a plan view of the playback device seen from the reverse side.
Figure 5:
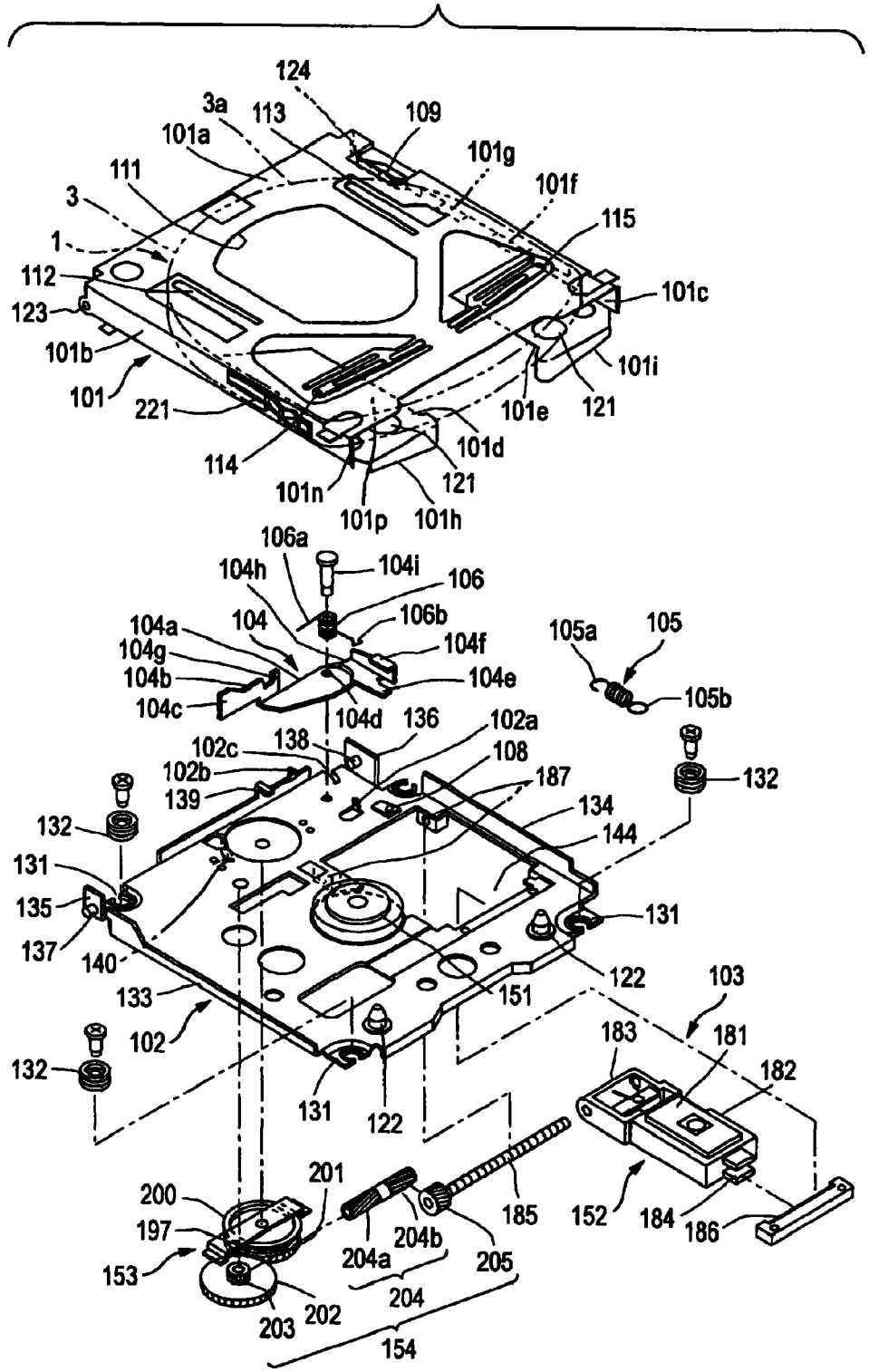
FIG. 5 is an exploded perspective view of the playback device.

FIG. 1 is a perspective view of a playback device 100 in a state in which a cartridge holder 102 is in a cartridge insertion/ejection position, FIG. 2 is a perspective view of the playback device in a state in which a cartridge 1 is housed in a cartridge holder 101, FIG. 3 is a perspective view of the playback device in a state in which the cartridge holder 101 is in a recording/playback position, FIG. 4 is a plan view seen from the reverse side and FIG. 5 is an exploded perspective view.

The playback device 100 includes a cartridge holder 101 in which a recording medium cartridge (hereinafter, referred to as a cartridge) 1 is inserted and held, a chassis 102 supporting the cartridge holder 101 so as to be movable between the cartridge insertion/ejection position and the recording/playback position, a recording/playback mechanism 103 provided on the chassis 102 and performing playback of information of the cartridge 1, a cartridge eject mechanism 107 having an eject lever 104 provided on the chassis 102 so as to be able to make turning movement (hereinafter, referred to as just turning) in insertion/ejection directions of the cartridge 1 as well as so as to be movable in directions connecting to and separating from the chassis 102, which turns by being pushed by the cartridge 1 inserted in the cartridge holder 101, an eject spring 105 giving the eject lever 104 turning force in a direction of ejecting the cartridge and force in a direction of pushing on an upper face of the chassis 102, and a damper spring 106 giving the eject lever 104 braking force, an eject lever locking portion 108 locking (positioning lock) the eject lever 104 turned by the insertion of the cartridge 1 on the chassis 102 and an eject lever locking release portion 109 releasing the lock of the eject lever 104 by the eject lever locking portion 108 when the cartridge holder 101 is turned from the recording/playback position to the cartridge insertion/ejection position.

The eject lever locking release portion 109 is provided at the cartridge holder 101 and releases a lock of the eject lever 104 by the eject lever locking portion 108 by pushing up the eject lever 104 when the cartridge holder 101 is turned from the recording/playback position to the cartridge insertion/ejection position.

As shown in FIG. 1 and FIG. 6A to FIG. 6C, when the cartridge 1 is inserted in the cartridge holder 101 in a state in which the cartridge holder 101 is in the cartridge insertion/ejection position (state in which the cartridge holder 101 inclines with respect to the chassis 102 at a prescribed inclination angle), a portion to be pressed 104c of the eject lever 104 is pushed in front of the cartridge 1, and the eject lever 104 turns clockwise about a shaft portion 104i, opposing against the spring force of the eject spring 105.

As shown in FIG. 2 and FIG. 7A to FIG. 7D, when the cartridge 1 is inserted into a predetermined position of the cartridge holder 101, a portion to be locked 104e of the eject lever 104 climbs over the eject lever locking portion 108 and engages with one end portion 108a of the eject lever locking portion 108 to prevent return-turning of the eject lever 104. As shown in FIG. 7D, the one end portion 108a of the eject lever locking portion 108 is an approximately vertical surface so that the portion to be locked 104e of the eject lever 104 is positively engaged with the one end portion 108a. On the other hand, the other end portion 108*b* of the eject lever locking portion 108 is an inclined surface so that the portion to be locked 104*e* of the eject lever 104 climbs over the eject lever lock portion 108.

Figure 8A:
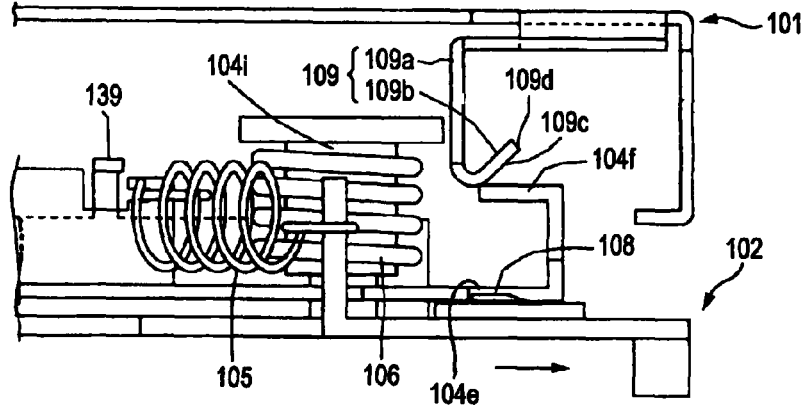
FIG. 8A is a side view showing a state in which an eject lever locking release member engages with a locking release member catch portion.
Figure 8B:
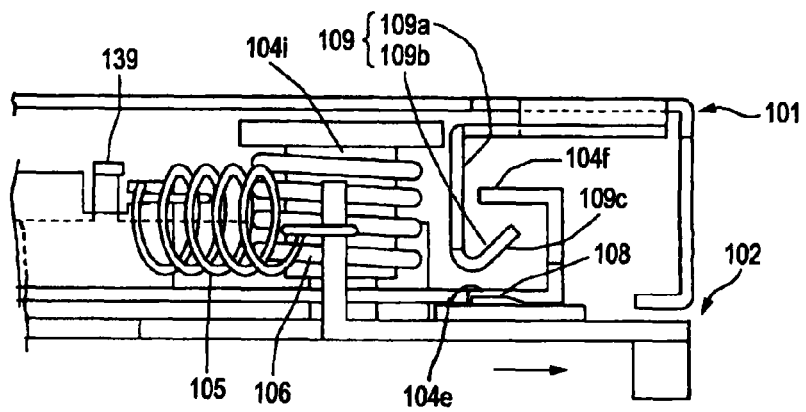
FIG. 8B is a side view showing a state in which the engagement between the eject lever locking release member and the locking release member catch potion is released.

As shown in FIG. 3, when the cartridge 1 is inserted and the cartridge holder 101 is moved to the recording/playback position, as shown in FIG. 8A, an inclined surface 109*c* of a ratchet-like pawl portion 109*b* of the eject lever locking release portion 109 touches a tip portion of a locking release member catch portion 104*f* of the eject lever 104, the eject lever locking release portion 109 bends at a part of an arm portion 109*a* and the pawl portion 109*b* moves in a direction of escaping from the locking release member catch portion 104*f*. When the pawl portion 109*b* passes the locking release member catch portion 104*f*, as shown in FIG. 8B, the pawl portion 109*b* returns to the original position so as to be in a state in which the pawl portion 109*b* enters the undersurface side of the locking release member catch portion 104*f* so as to be engaged with the undersurface thereof. Under this state, recording and playback of recording media such as an optical disc and the like are performed.

Figure 8C:
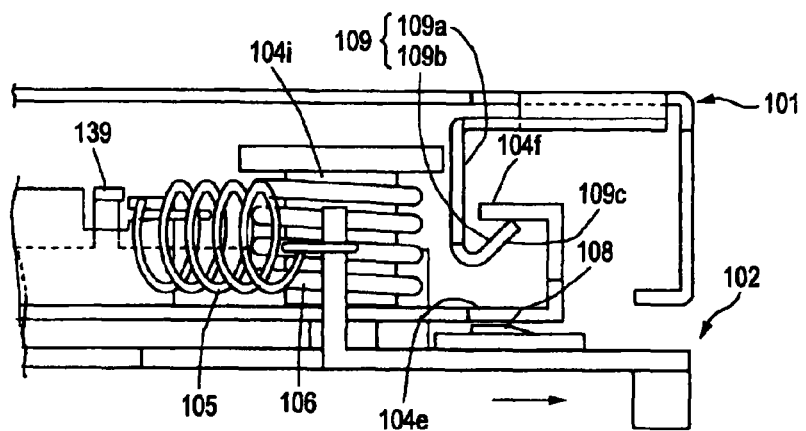
FIG. 8C is a side view showing a state in which the locking release member catch portion is lifted by the eject lever locking release member.

After finishing recording/playback, when the cartridge holder 101 is moved to the cartridge insertion/ejection position, as shown in FIG. 8C, the eject lever 104 is lifted by the pawl portion 109*b* of the eject lever locking release portion 109 to release the lock of the eject lever 104 by the eject lever locking portion 108. The eject lever 104 makes return-turning counterclockwise by the eject spring 105, turning slowly with breaking force given by the damper spring 106 in the return-turning to push the cartridge 1 out from the cartridge holder 101.

The recording/playback mechanism 103 includes a spindle motor 151, an optical pickup 152, a thread motor 153, a transmission gear group 154 and so on, which transmits the rotation of the thread motor 153 to the optical pickup.

Then, when the cartridge 101 is inserted in the cartridge holder 101 and moved to the recording/playback position, an optical disc in the cartridge holder 101 is chucked on the spindle motor 151, and information recorded in the optical disc is played back while the optical pickup 152 is moved in a radius direction of the optical disc by the thread motor 153 and the transmission gear group 154.

(2) Configuration of the Thread Motor

Figure 32:
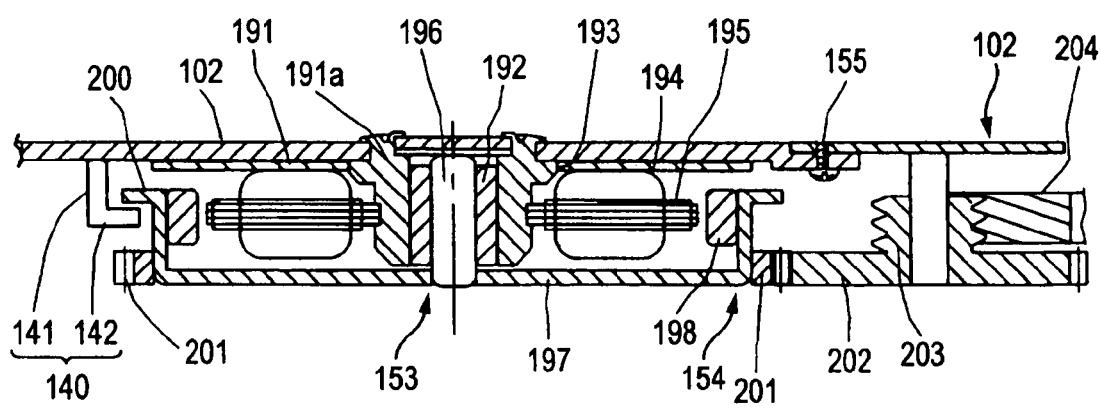
FIG. 32 is a cross-sectional view of a thread motor.

As shown in FIG. 32, the thread motor 153 is attached to a stator substrate 191 as a motor supporting plate, in a pendent state under a chassis 102 by means of a screw 155 and the like so that an outer peripheral portion of the stator substrate 191 is overlapped with an undersurface of the chassis 102.

The thread motor 153 includes a tubular bearing portion 191*a* provided at the stator substrate 191, a bearing 192 fixed in an inner periphery of the bearing portion 191*a*, a wiring plate 194 placed on the stator substrate 191 in a state in which the bearing portion 191*a* is inserted into a central hole 193, an iron-core coil 195 arranged at an outer peripheral portion of the tubular bearing portion 191*a*, a rotor 197 attached rotatably in a state in which a rotating shaft 196 is inserted in the bearing 192. A rotor magnet 198 to be a pair with the iron-core coil 195 is provided at an inner surface of the rotor 197.

Figure 33:
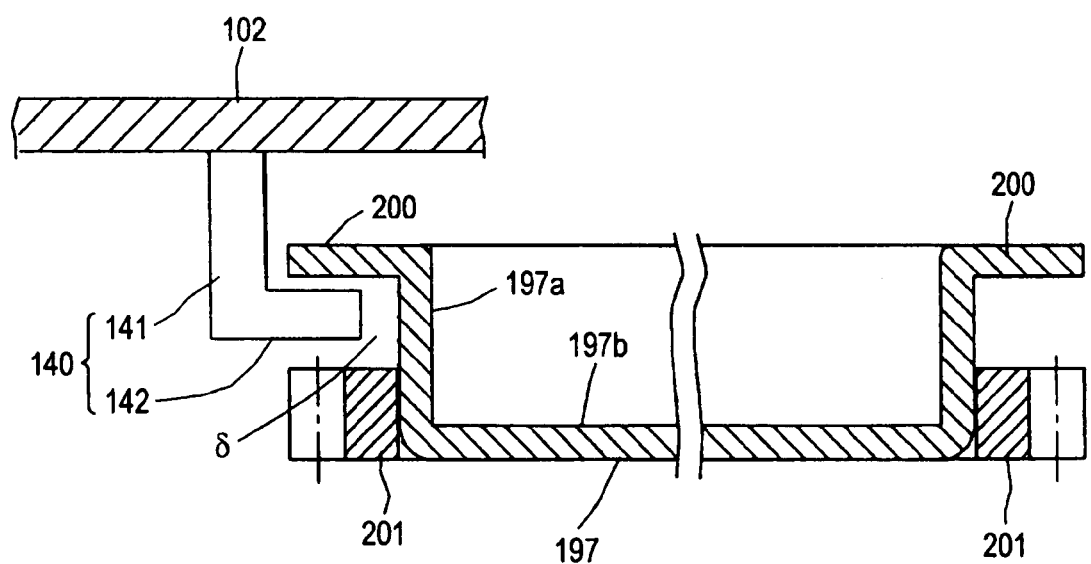
FIG. 33 is a cross-sectional view of a rotor of the thread motor.
Figure 34:
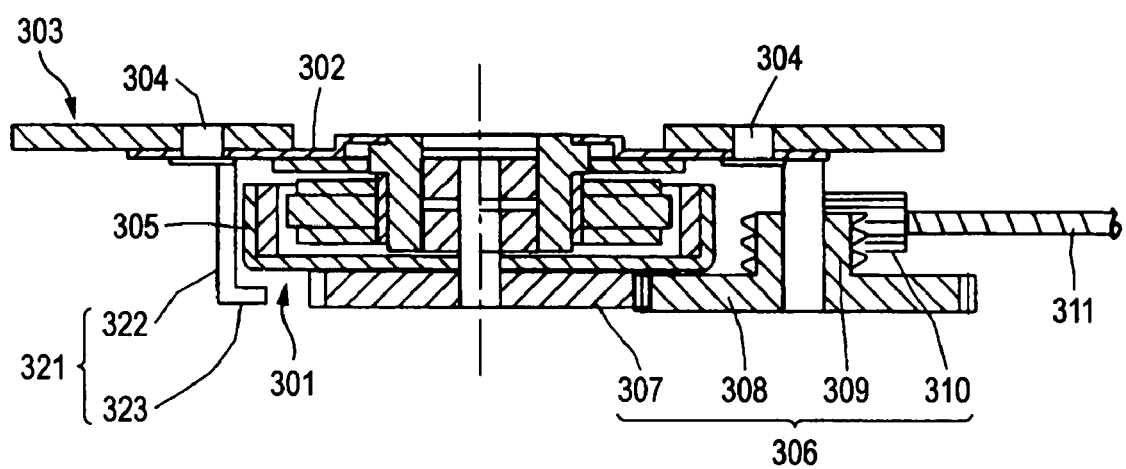
FIG. 34 is a cross-sectional view of an example of a related art.

As shown in FIG. 33, the rotor 197 is formed in a cylindrical shape having a bottom with a cylindrical portion 197*a* and a bottom portion 197*b*, including a ring-shaped first gear 201 at an end of an outer peripheral surface on the side of the bottom portion 197*b* of the cylindrical portion 197*a* and a flange portion 200 at an end of an opposite side of the bottom portion 197*b* of the cylindrical portion 197*a* with a prescribed clearance with respect to the ring-shaped gear 201.

The ring-shaped first gear 201 is integrally formed at the outer surface of the rotor 197 by outsert molding and the like. The flange portion 200 is formed by folding an end portion of an opening side of the rotor 197 at approximately right angles toward the outside.

The rotation of the rotor 197 of the thread motor 153 is transmitted to the optical pickup 152 through the transmission gear group 154.

(3) Configuration of the Motor Falling Prevention Portion

A motor falling prevention portion 140 is provided for preventing the thread motor 153 from falling away from the chassis 102 caused by, for example, the screw 155 being loosened. As shown in FIG. 32 and FIG. 33, the motor falling prevention portion 140 is formed in an approximately L-shape by a vertical piece portion 141 formed approximately vertically along an outer peripheral surface of the thread motor 153 at the undersurface side of the chassis 102 and a horizontal piece portion 142 formed by folding a tip portion of the vertical piece portion 141 at approximately right angles toward the center of the thread motor 153, and a tip of the horizontal piece portion 142 is inserted between the ring-shaped gear 201 and the flange portion 200 provided at the outer peripheral surface of the rotor 197.

The vertical piece portion 141 has elasticity, and it is preferable that the vertical piece portion 141 is bent to make the horizontal piece portion 142 in a so-called escaped state so as not to be an obstacle when the thread motor 153 is fixed to the chassis 102.

The motor falling prevention portion 140 formed by cutting the chassis 102 or by performing the outsert molding to the chassis 102.

The motor falling prevention portion 140 has the above configuration, and when the thread motor 153 is moved in a falling direction away from the chassis 102, the horizontal piece portion 142 of the motor falling prevention portion 140 engages with the flange portion 200 of the rotor 197 to prevent further movement in the falling direction of the thread motor 153, which prevents the thread motor 153 from falling away from the chassis 102. In the above embodiment, the case in which one motor falling prevention portion 140 is provided was shown, however, it is also preferable to provide plural motor falling prevention portions 140. In this case, it is preferable that at least two motor falling prevention portions are provided at positions opposed to each other with the thread motor 153 sandwiched therebetween. It is also preferable that the motor falling prevention portions 140 are arranged around the thread motor 153 at approximately equal intervals. The falling prevention effect can be further improved by providing plural motor falling prevention portions 140.

(4) Configuration of the Transmission Gear Group

The transmission gear group 154 transmits the rotation of the thread motor 153 to the side of the optical pickup to drive the optical pickup. As shown in FIG. 5, the transmission gear group 154 includes a second gear 202 engaging with the ring-shaped gear (hereinafter, referred to as the first gear) 201 provided at the outer peripheral surface of the rotor 197, a third gear 203 formed on an upper surface of the second gear 202 (a surface facing the chassis 102) coaxially with the second gear 202, a fourth gear 204 engaging with the third gear 203 and a fifth gear 205 engaging with the fourth gear 204. The fifth gear 205 is fixed at an end portion of the lead screw 185 of the optical pickup 152.

A flat plate gear (spur gear) is used for the second gear 202. A worm gear is used for the third gear 203. A shaft-shaped worm gear is used for the fourth gear 204. The worm gear is used for the fifth gear 205.

In the fourth gear 204, one end side 204a and the other end side 204b have reverse threads, taking the center of the gear in the longitudinal direction as a boundary, and the third gear 203 engages with the one end side 204a and the fifth gear 205 engages with the other end side 204b. The optical pickup 152 is driven by rotating the lead screw 185 by the thread motor 153 through the first gear 201, the second gear 202, the third gear 203 and the fourth gear 204 and the fifth gear 205.

The reason why the one end side 204a and the other end side 204b of the fourth gear 204 are formed to have reverse threads is to align rotation directions of the third gear 203 and the fifth gear 205. It is also preferable that the number of gear teeth is changed at the one end side 204a and at the other end side 204b of the fourth gear 204 to change speed reduction ratio at the one end side 204a and at the other end side 204b.

Figure 35:
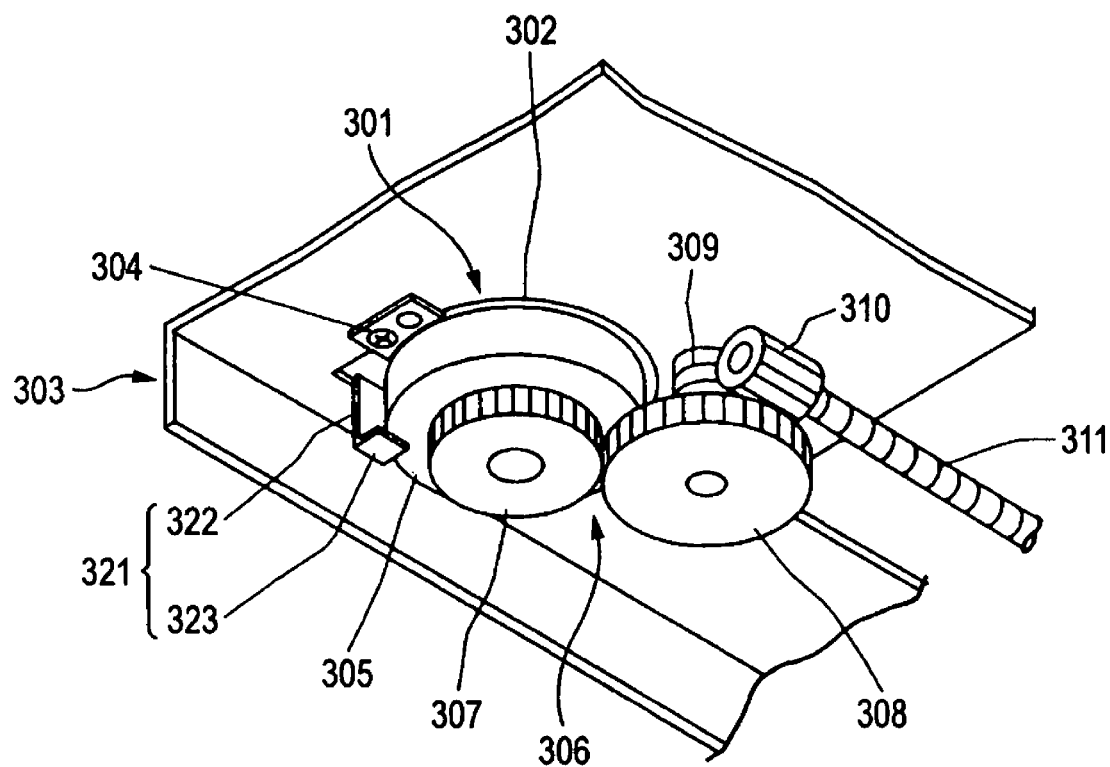
FIG. 35 is a cross-sectional view of an example of a related art.

As described above, according to the configuration in which the ring-shaped first gear 201 is provided at the outer peripheral surface of the rotor 197 of the thread motor 153, the flat-plate second gear 202 is engaged with the first gear 201, and a third gear 203 is provided at the upper surface of the second gear 202 (the surface facing the chassis) to engage the fourth gear 204 with the third gear 203, the thickness of the thread motor and a space of a mechadeck in the thickness direction occupied by the transmission gear group 154 can be thinner as compared with the case in which the first gear is provided at the bottom surface of the rotor as shown in FIG. 35, as a result, it is possible to make the mechadeck small and thin.

(5) Configuration of the Spindle Motor

Figure 20:
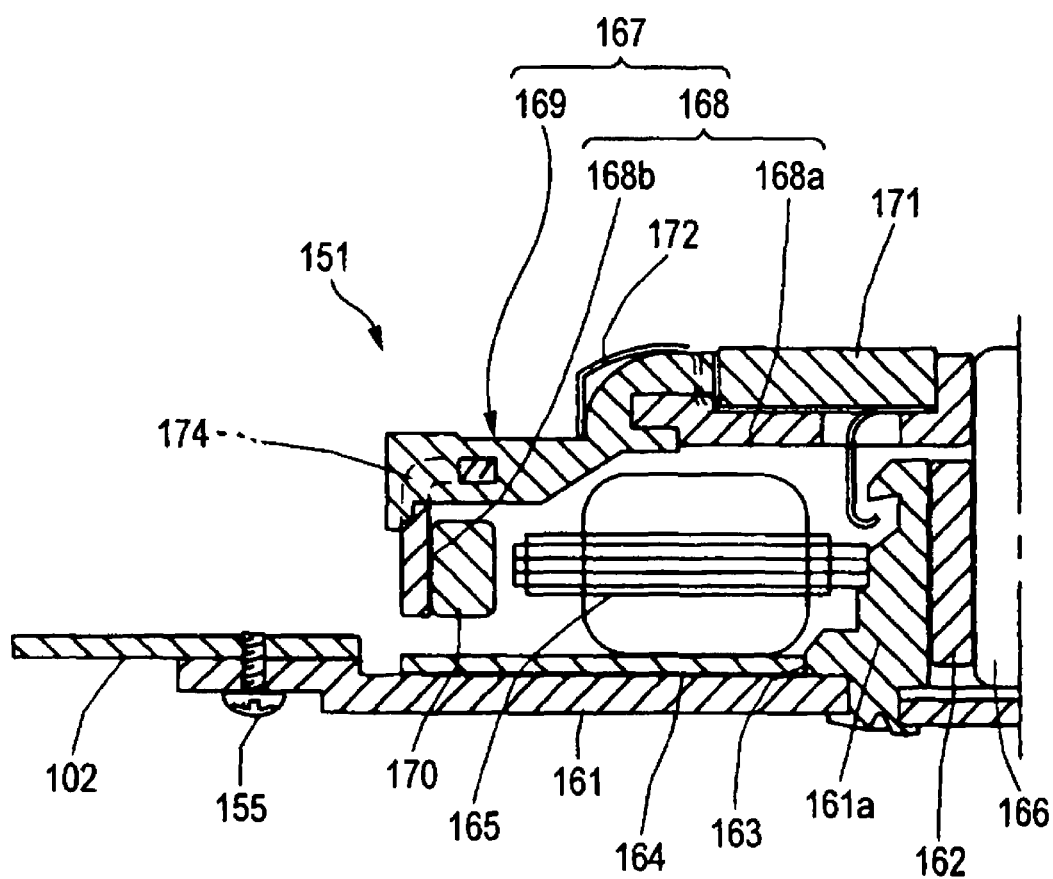
FIG. 20 is a cross-sectional view of a spindle motor.

As shown in FIG. 20, the spindle motor 151 includes a tubular bearing portion 161a provided at a stator substrate 161, a bearing 162 attached at an inner periphery of the bearing portion 161a, a wiring plate 164 placed on the stator substrate 161 in a state in which the tubular bearing portion 161a is inserted into a central hole 163, an iron-core coil 165 attached at an outer peripheral portion of the tubular bearing portion 161a and a rotor assembly 167 rotatably attached in a state in which a tip of a rotating shaft 166 is inserted into the bearing 162. The rotor assembly 167 includes a rotor 168 and a disc table 169 made of synthetic resin, which is outsert molded on the rotor 168.

A rotor magnet 170 to be a pair with the iron-core coil 165 is provided at an inner surface of the rotor 168. A magnet 171 for chucking which magnetically chucks a hub 22 of a disc-type recording medium 2 and a centering spring 172 which performs centering of the disc-type recording medium 2 are attached to the disc table 169.

Figure 21:
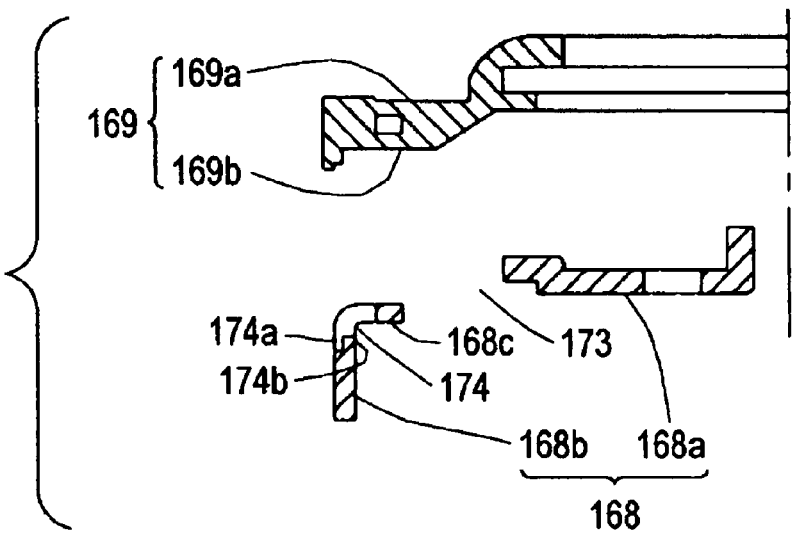
FIG. 21 is an exploded sectional view of relevant parts of a rotor and a disc table of the spindle motor.

As shown in FIG. 21 in a disassembled state, the rotor assembly 167 includes the rotor 168 made of metal and the disc table 169 made of synthetic resin, which is outsert molded on the rotor 168.

The rotor 168 includes a top surface portion 168a having an approximately circular shape and a tubular skirt portion 168b arranged at an outer peripheral surface of the top surface portion 168a with a predetermined clearance 173. A ring-shaped flange portion 168c is formed at an upper end of the tubular skirt portion 168b by folding the upper end inside at approximately right angles.

First resin introduction holes 174 are formed at a folded portion at the upper end of the skirt portion 168b. The first resin introduction holes 174 are arranged at the tubular skirt portion 168b in a circumferential direction at predetermined intervals.

The disc table 169 includes a table body portion 169a positioned at the outer surface side of the rotor 168 and a rotor-inner surface overlapping portion 169b positioned at the inner surface side of the rotor 168.

Figure 22:
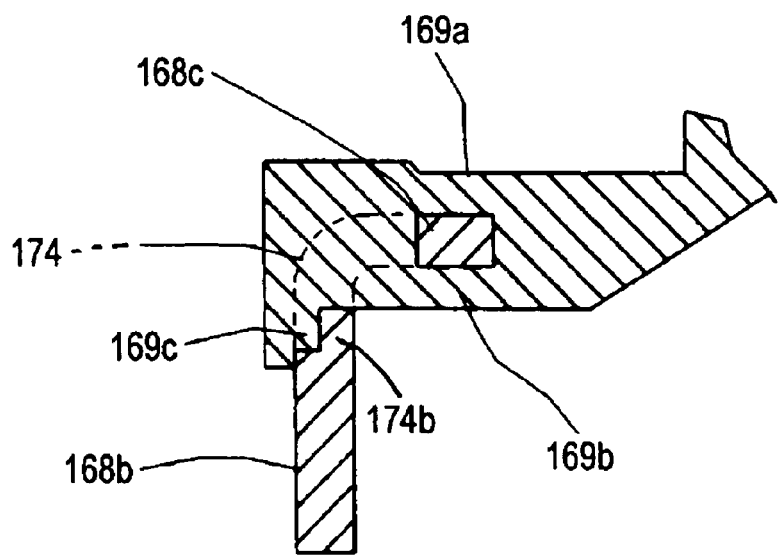
FIG. 22 is a cross-sectional view showing a state in which relevant parts of the rotor and disc table are combined.

The disc table 169 is outsert molded by positioning and arranging the top surface portion 168a and the tubular skirt portion 168b of the rotor 168 in a mold with the predetermined clearance 173, then, by injecting molten resin in the mold. Then, the inner surface of the table body portion 169a and the outer surface of the rotor-inner surface overlapping portion 169b are joined by the clearance 173 and the first resin introduction holes 174 as shown in FIG. 22 to strengthen the joint between the rotor 168 and the disc table 169. As shown in FIG. 21, a lower end side of the circumference edge portion of the first resin introduction hole 174 forms a thin-walled portion 174b at the inner surface side by forming a concave portion 174a at the outer surface side. This strengthens the table body portion 169a to be thick by allowing the thickness of a portion 169c corresponding to the concave portion 174a in the table body portion 169a by introducing part of the resin into the concave portion 174a when the disc table 169 is outsert-molded as shown in FIG. 22.

Figure 23:
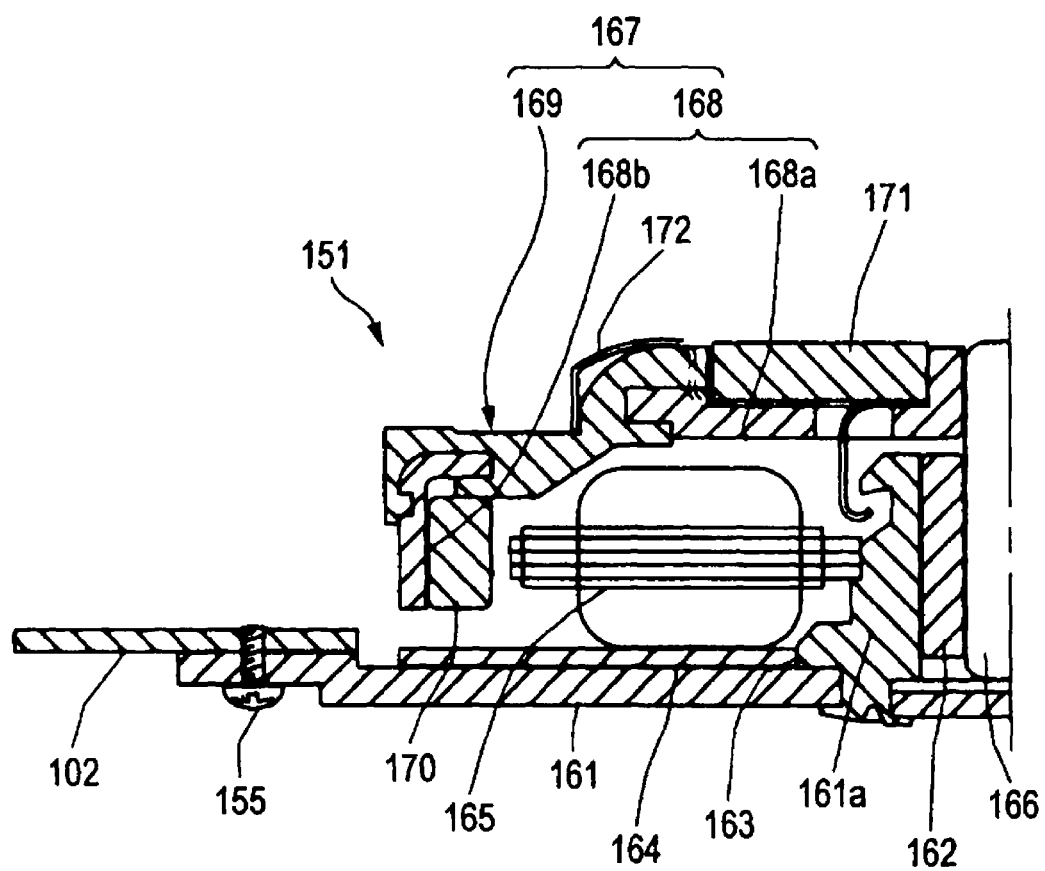
FIG. 23 is a cross-sectional view of the spindle motor according to a second embodiment.
Figure 24:
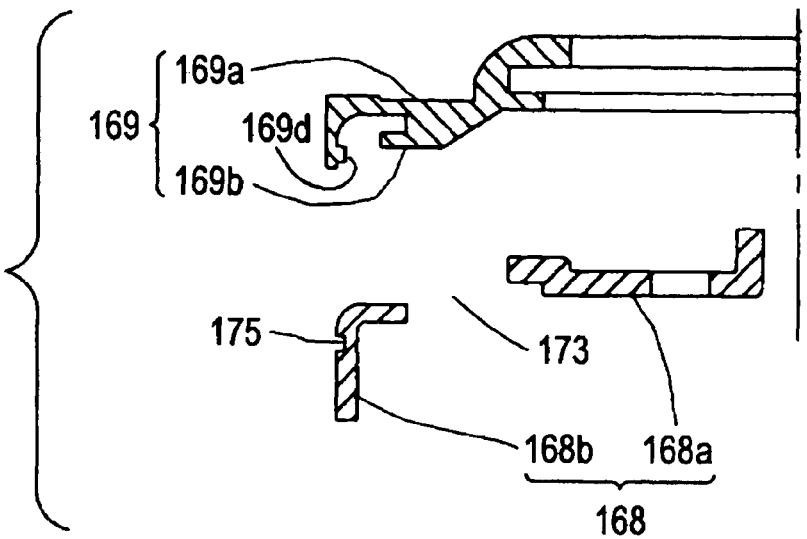
FIG. 24 is an exploded sectional view of relevant parts of a rotor and a disc table of the spindle motor according to the second embodiment.
Figure 25:
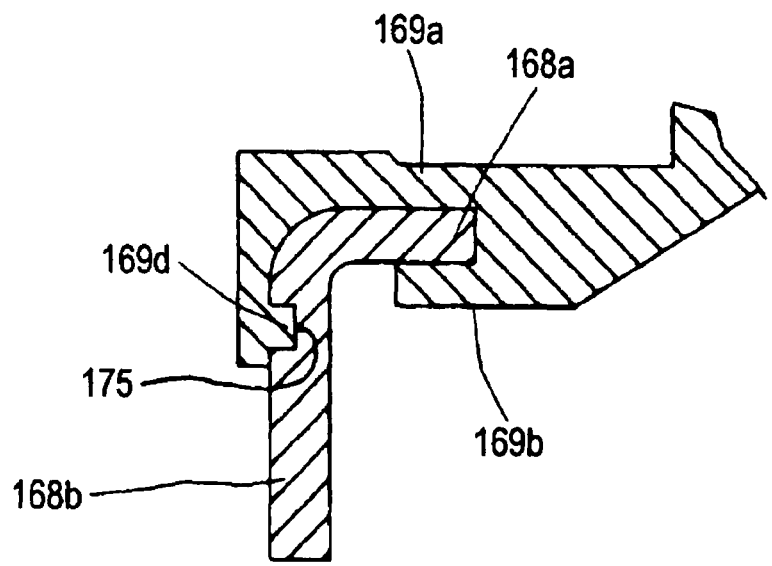
FIG. 25 is a cross-sectional view showing a state in which relevant parts of the rotor and disc table according to the second embodiment are combined.

FIG. 23 to FIG. 25 show another (second) embodiment for strengthening the joint between the rotor 168 and the disc table 169. In the embodiment, a groove portion 175 for introducing part of synthetic resin forming the disc table 169 is formed at the outer peripheral surface of the skirt portion 168b of the rotor 168, and when the disc table 169 is outsert-molded, part of resin 169d at the side of the table body portion 169a is introduced into the groove portion 175, thereby strengthening the joint between the rotor 168 and the disc table 169. Since other configurations are the same as the case of the first embodiment, the same signs are put to the same components and repeated explanations are omitted.

Figure 26:
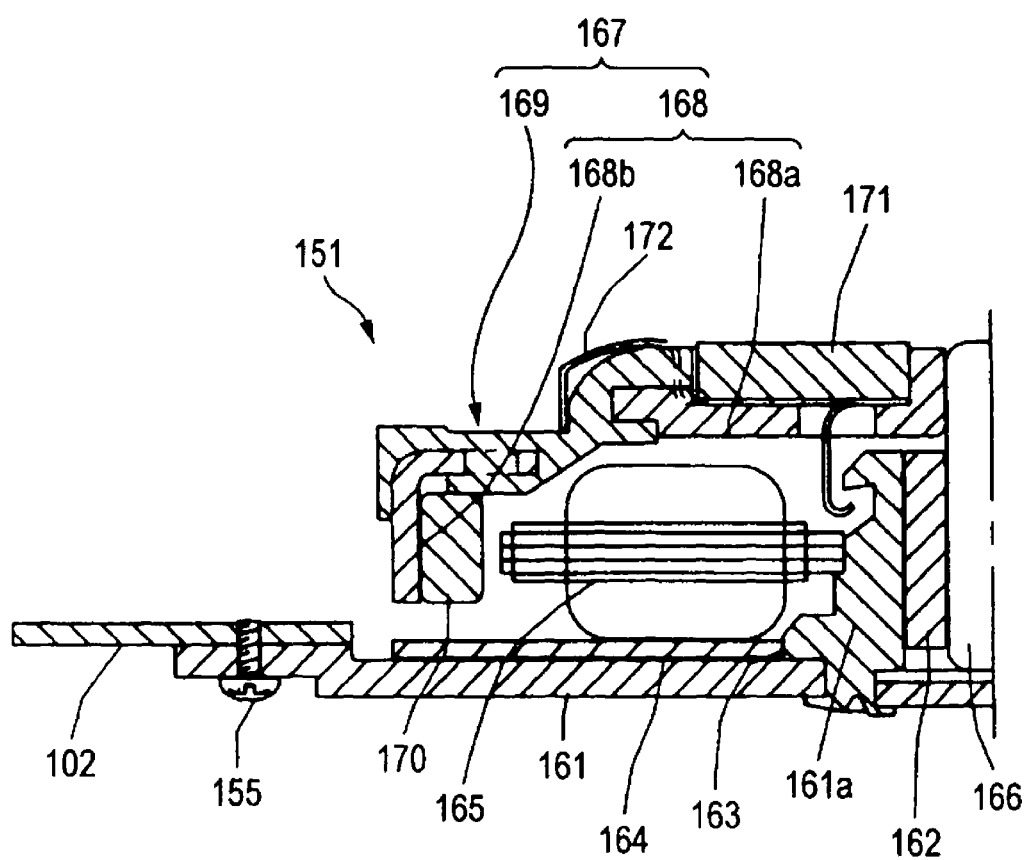
FIG. 26 is a cross-sectional view of the spindle motor according to a third embodiment.
Figure 27:
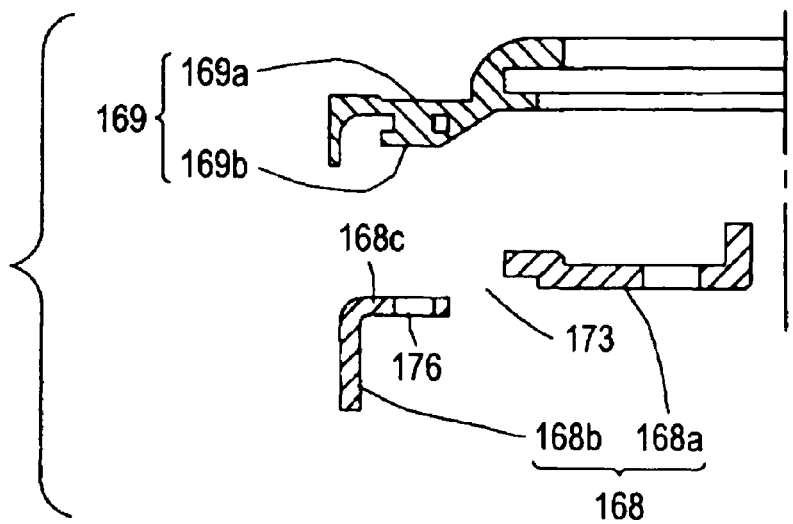
FIG. 27 is an exploded sectional view of relevant parts of a rotor and a disc table of the spindle motor according to the third embodiment.
Figure 28:
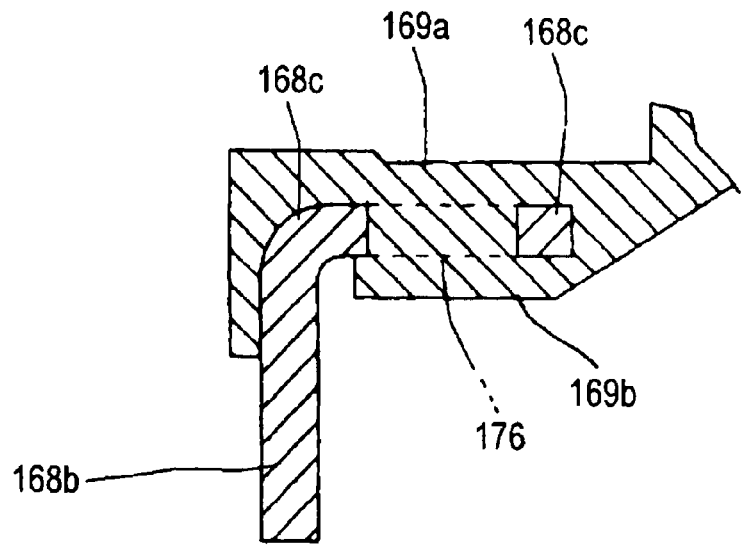
FIG. 28 is a cross-sectional view showing a state in which relevant parts of the rotor and disc table according to the third embodiment are combined.

FIG. 26 to FIG. 28 show further another (third) embodiment for strengthening the joint between the rotor 168 and the disc table 169. In the embodiment, second resin introduction holes 176 are formed at the flange portion 168c by allowing the width of the ring-shaped flange portion 168c provided at an upper end of the tubular skirt portion 168b to be slightly wider than the case of the first embodiment.

When the disc table 169 is outsert-molded on the rotor 168, the inner surface of the table body portion 169a and the outer surface of the rotor-inner surface overlapping portion 169b are joined by the second resin introduction holes 176 to strengthen the joint between the rotor 168 and the disc table 169. Since the other configurations are the same as the case of the first embodiment, the same signs are put to the same components and repeated explanations are omitted.

Figure 29:
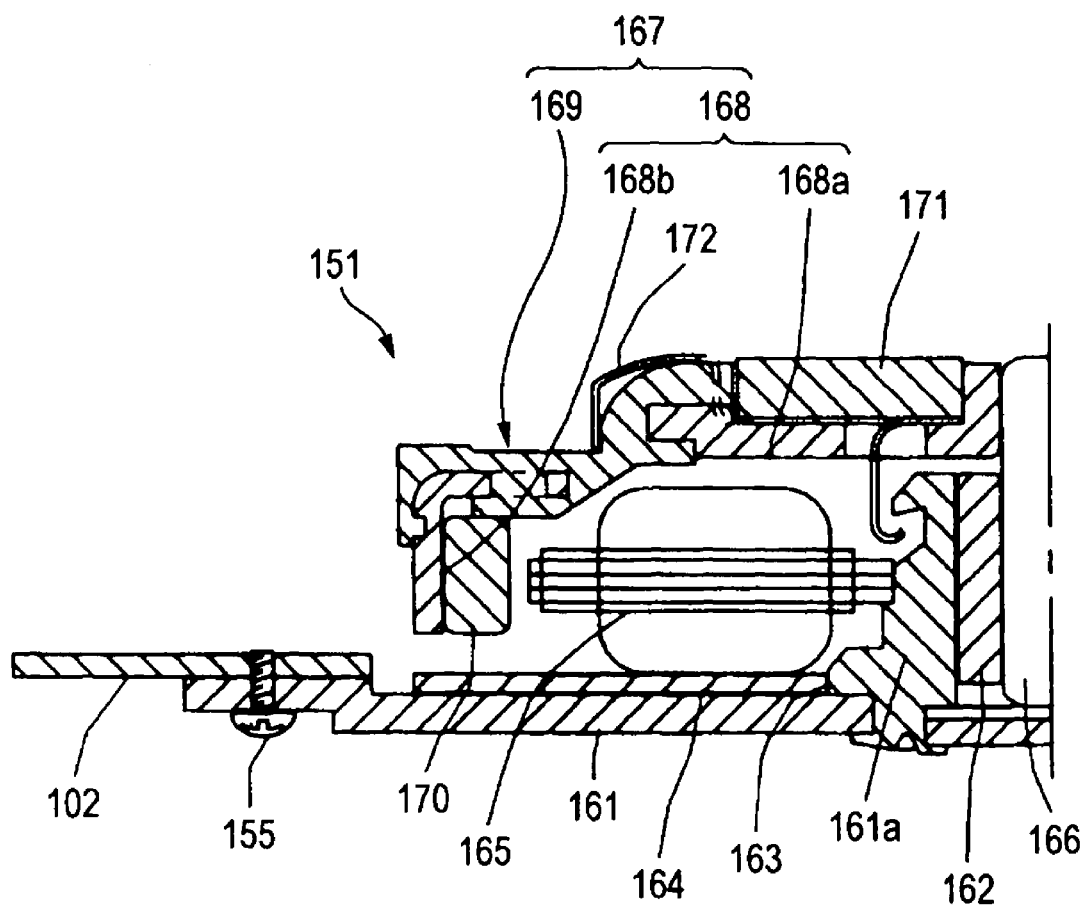
FIG. 29 a cross-sectional view of the spindle motor according to a fourth embodiment.
Figure 30:
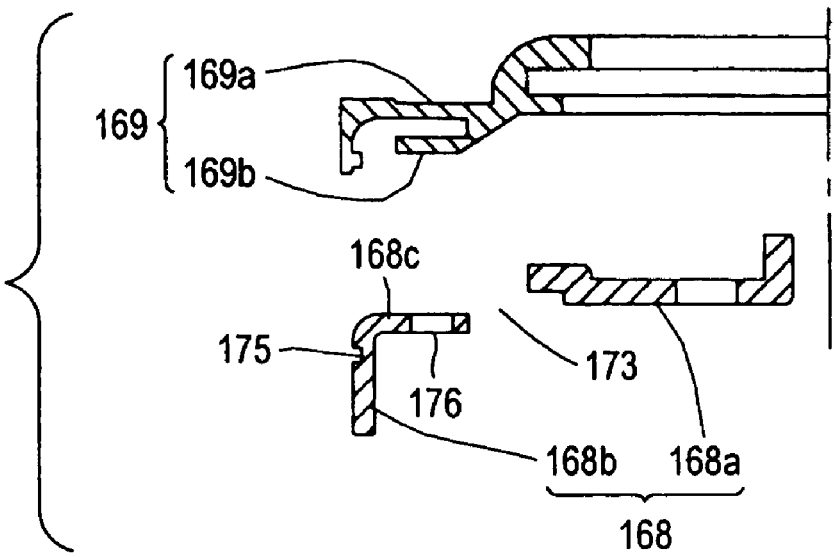
FIG. 30 is an exploded sectional view of relevant parts of a rotor and a disc table of the spindle motor according to the fourth embodiment.
Figure 31:
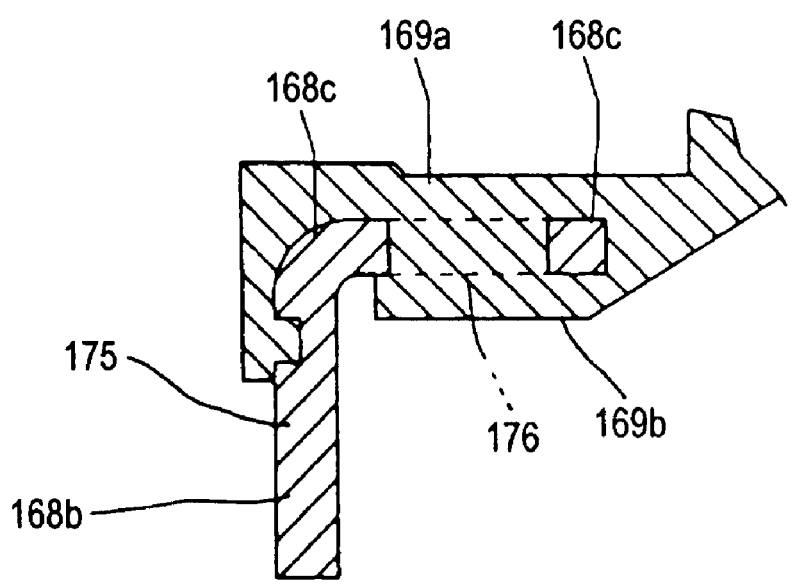
FIG. 31 a cross-sectional view showing a state in which relevant parts of the rotor and disc table according to the fourth embodiment are combined.

FIG. 29 to FIG. 31 show further another (fourth) embodiment for strengthening the joint between the rotor 168 and the disc table 169. The embodiment combines the second embodiment and the third embodiment, in which the groove portion 175 for introducing part of synthetic resin forming the disc table 169 at the outer peripheral surface of the skirt portion 168b of the rotor 168 as well as the second resin introduction holes 176 are provided at the flange portion 168c, having both effect of the second embodiment and effect of the third embodiment. Since other configurations are the same as the cases of the second and third embodiments, the same signs are put to the same components and repeated explanations are omitted. In the above embodiments, the case in which the rotor 168 is formed by two components, namely, the top surface portion 168a and the tubular skirt portion 168b was shown, however, it is also preferable that the top surface portion 168a and the tubular skirt portion 168b are integrated and holes for injecting resin corresponding to the clearance 173 are provided between the top surface 168a and the tubular skirt portion 168b.

(6) Configuration of the Optical Pickup

As shown in FIG. 5, the optical pickup 152 includes an objective lens drive device 181 and a moving table 182 which moves the objective lens drive device 181 in a radius direction of the disc-type recording medium 2 chucked on the disc table 169.

The moving table 182 includes a first bearing portion 183 and a second bearing portion 184. The lead screw 185 is fixed to the first bearing portion 183. A guide portion 186 is fixed to the second bearing portion 184.

The lead screw 185 is rotatably supported by a pair of bearings 187 at the undersurface side of the chassis 102. The guide portion 186 is integrally formed with the chassis 102 by outsert molding.

The optical pickup 152 moves in the radius direction of an optical disc on the disc table 169 by rotating the lead screw 185. The optical pickup 152 has a configuration in which not only playback of information but also recording thereof is possible.

(7) Configuration of the Cartridge Eject Mechanism

As described above, the cartridge eject mechanism 107 ejects the cartridge 1 from the cartridge holder 101 after finished, including the eject lever 104, the eject spring 105 and the damper spring 106.

Figure 9A:
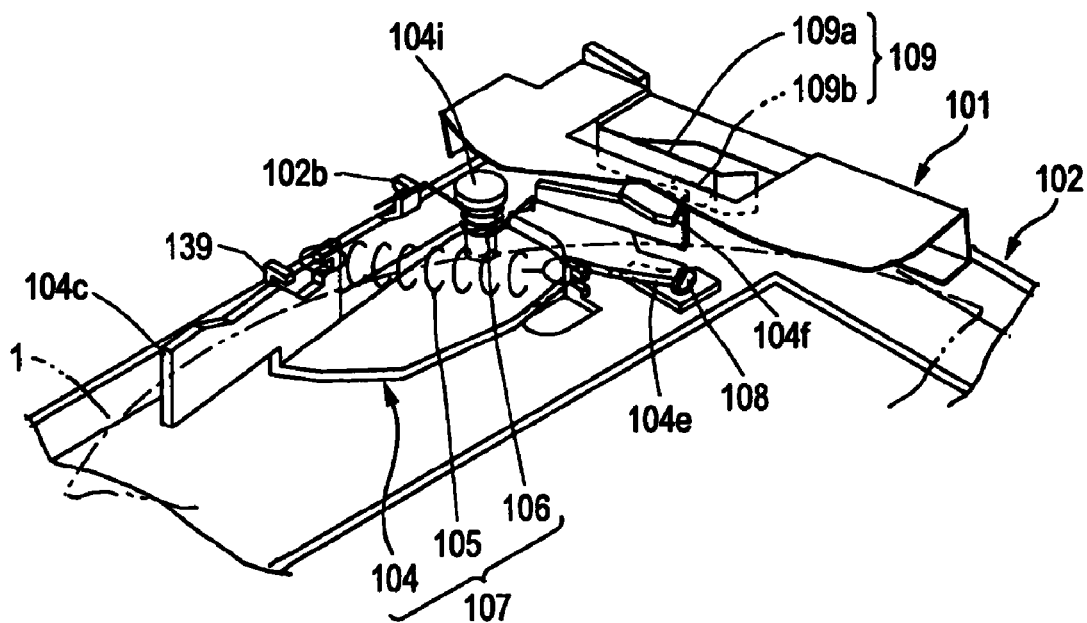
FIG. 9A is a perspective view showing a state in which the lock is released and the eject lever makes return-turning slightly and FIG. 9B is a plan view of the same.
Figure 9B:
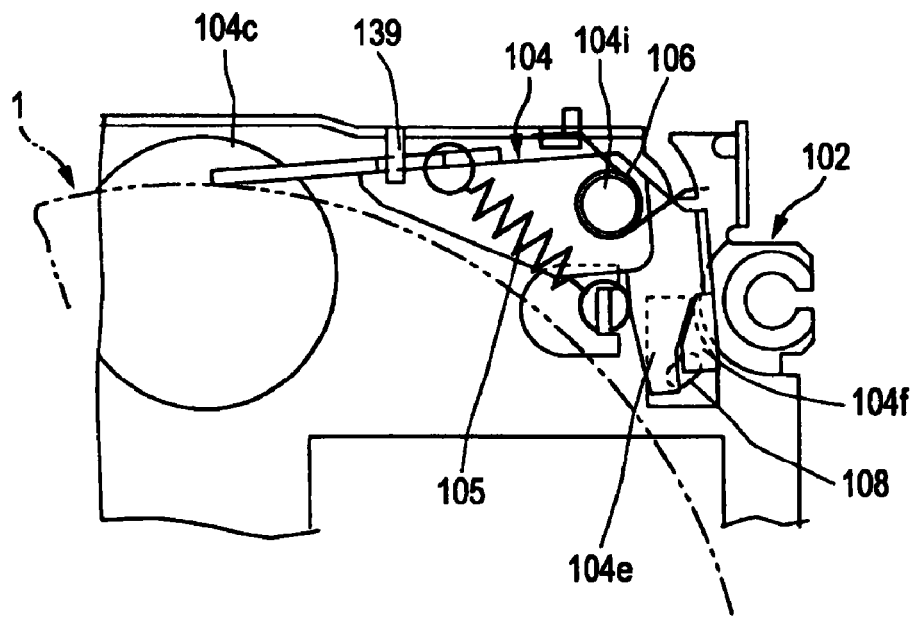

As shown in FIG. 9A and FIG. 9B, the eject mechanism 107 including the eject lever 104, the eject spring 105, the damper spring 106 and the like is arranged in a space, so-called dead space which is formed by a front surface of the cartridge 1 housed in the cartridge holder 101, an upper surface of the chassis 102 and an undersurface of the cartridge holder 101.

When the cartridge 1 is inserted, the eject lever 104 is pushed by a front surface of a cartridge body 3, turning against spring force of the eject lever 105 to be locked so as not to be return-turned by the eject lever locking portion 108 provided at the chassis 102. When the cartridge holder 101 is moved to the cartridge insertion/ejection position after finished, the lock by the eject lever locking portion 108 is released by the eject lever locking release portion 109 which will be described later and the eject lever 104 makes return-turning by spring force of the eject spring 105 to eject the cartridge 1 from the cartridge holder 101.

As shown in FIG. 5, the eject lever 104 includes a base portion (flat-plate main portion) 104a having an approximately L-shape overlapped with the upper surface of the chassis 102, the portion to be pressed 104c provided at one end side of the base portion 104a through an arm portion 104b and pressed by the front surface 3a of the cartridge body 3 of the cartridge 1, a bearing hole 104d formed at the center of the base portion 104a, the portion to be locked 104e provided at the other end side of the base portion 104a and engaging with the eject lever locking portion 108 in a state in which the cartridge 1 is completely housed in the cartridge holder 101, the locking release member catch portion 104f provided at an upper position and in the vicinity of the portion to be locked 104e and engaging with the eject lever locking release portion 109 provided at the cartridge holder 101 when the cartridge 1 is moved from the cartridge insertion/ejection position to the recording/playback position, a first eject spring locking portion 104g provided at an end portion of the arm portion 104b at the opposite side of the portion to be pressed 104c and a damper spring contact portion 104h provided at the center portion of the base portion 104a and making contact with an end portion 106b of the damper spring 106 which will be described later when the eject lever 104 turns at a predetermined angle.

The eject lever 104 is attached to the upper surface of the chassis 102 so that the center portion of the base portion 104a can be turned about the shaft 104i as well as so that the base portion 104a and the portion to be locked 104e can be slightly floated from the upper surface of the chassis 102.

For the eject spring 105, a helical extension spring is used. In the eject spring 105, one end portion 105a is locked at the first eject spring locking portion 104g provided at the eject lever 104, and the other end portion 105b is locked at a second eject spring locking portion 102a provided at the upper surface of the chassis 102 to give turning force in the direction of ejecting the cartridge to the eject lever 104 as well as to give force pressing the base portion 104a of the eject lover 104 on the upper surface of the chassis 102. The eject lever locking portion 108 is arranged in the vicinity of a position where a line connecting the first eject spring locking portion 104g and the second eject spring locking portion 102a is extended.

The damper spring 106 prevents the cartridge 1 from falling away from the cartridge holder 101 by giving breaking force to the eject lever 104 and reduces turning speed of the eject lever 104 when the eject lever 104 makes return-turning at a predetermined angle due to spring force of the eject spring 105. A helical torsion spring is used for the damper spring 106.

The damper spring 106 is attached to an outer periphery of the shaft portion 104i, and one end portion 106a is locked at a damper spring locking portion 102b provided at the chassis 102. The other end portion 106b of the damper spring 106 is inserted into a damper spring end-portion receiving groove 102c provided at the chassis 102.

Figure 6A:
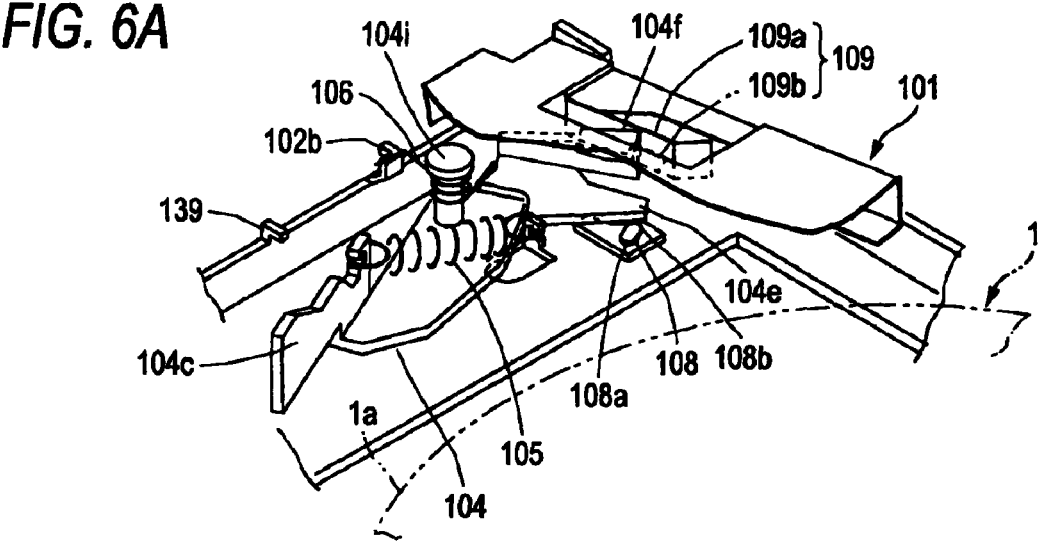
FIG. 6A is a perspective view of an eject lever portion showing a state in which the lock is released.
Figure 6B:
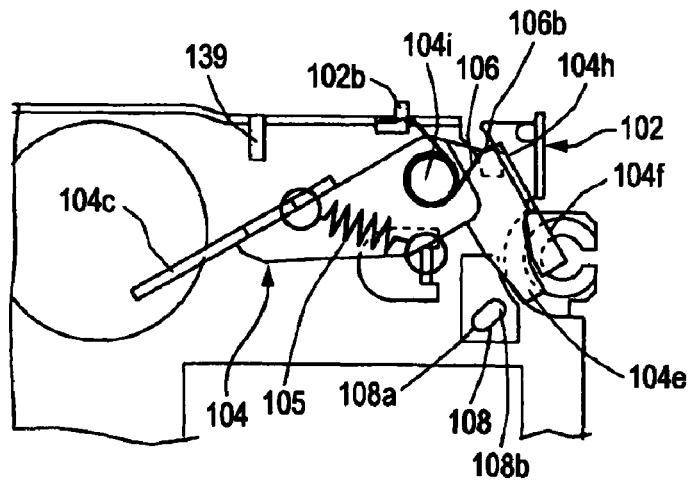
FIG. 6B is a plan view of the same and FIG. 6C is side view of the same.
Figure 6C:
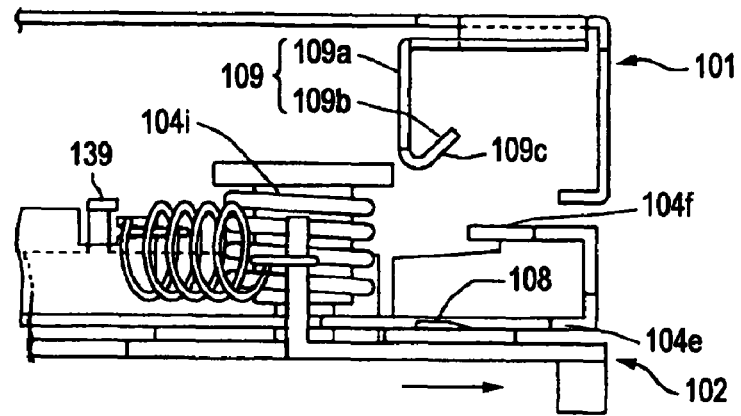

As shown in FIG. 7B, the other end portion 106b of the damper spring 106 abuts on an end portion of the receiving groove 102c in a state in which the eject lever 104 is locked by the eject lever locking portion 108. As shown in FIG. 6B, when the eject lever 104 is return-turned in the direction ejecting the cartridge by spring force of the eject spring 105, the damper spring contact portion 104h of the eject lever 104 makes contact with the other end portion 106b of the damper spring 106 and the damper spring 106 is twisted to generate spring force of inverse direction of spring force of the eject spring 105 at the damper spring 106 to give breaking force to the eject lever 104.

The cartridge eject mechanism 107 has the above configuration. In the case that the cartridge 1 is inserted in the cartridge holder 101 at the cartridge insertion/ejection position (a state in which the cartridge holder 101 is inclined to the chassis 102 at a predetermined inclination angle θ) as shown in FIG. 1, when the portion to be pressed 104c is pushed by the front portion of the cartridge body 3 and turned against the spring force of the eject spring 105, and the cartridge 1 is completely housed in the cartridge holder 101, the eject lever 104 is locked so as not to be return-turned by the portion to be locked 104e at the outside surface of the flat plate main portion 104a being engaged at the eject lever locking portion 108 as shown in FIG. 2, and even when the cartridge holder 101 is moved to the recording/playback portion as shown in FIG. 3, the cartridge holder 101 is maintained so as not to be return-turned.

Then, when the cartridge holder 101 is turned from the recording/playback position to the cartridge insertion/ejection position after finished, the lock of the eject lever 104 is released by the eject lever locking release portion 109 which will be described next. Therefore, the eject lever 104 makes return-turning by the spring force of the eject spring 105 to eject the cartridge 1 from the cartridge holder 101. At this time, the damper spring 106 reduces speed of return-turning of the eject lever 104 to prevent the cartridge 1 from falling away from the cartridge holder 101 because of too much force when the cartridge 1 is pushed out.

(8) Configuration of a Eject Lever Locking Release Portion

The eject lever locking release portion 109 release the lock of the eject lever 104 by the eject lever locking portion 108 when the cartridge holder 101 is turned from the recording/playback position to the cartridge insertion/ejection position, allowing the eject lever 104 to be return-turned by the spring force of the eject spring to eject the cartridge 1 from the cartridge holder 101, which is called as a ratchet member based on the function.

As shown in FIG. 6A to FIG. 8C, the eject lever locking release portion 109 is provided in the cartridge holder 101, engaging with an undersurface side of the locking release member catch portion 104f provided at the eject lever 104 on the way to move the cartridge holder 101 from the cartridge insertion/ejection position to the recording/playback position. Then, when the cartridge holder 101 is moved from the recording/playback position to the cartridge insertion/ejection position, the eject lever locking release portion 109 floats the base portion 104a and the portion to be locked 104e from the upper surface of the chassis 102 slightly through the locking release member catch portion 104f to release the engagement between the portion to be locked 104e and the eject lever locking portion 108.

As shown in FIG. 8A to FIG. 8C, the eject lever locking release portion 109 includes the arm portion 109a having elasticity (flexibility) and the pawl portion 109b formed by folding the tip portion of the arm portion 109a at a sharp angle with respect to the arm portion 109a.

In the eject lever locking release portion 109, when the inclined surface 109c of the pawl portion 109b touches the side surface of the locking release member catch portion 104f and is escape-moved on the way to move the cartridge holder 101 from the cartridge insertion/ejection position to the recording/playback position, and the engagement between the inclined surface 109c and the locking release member catch portion 104f is released, the pawl portion 109b returns to the original position and a tip portion of 109d of the pawl portion 109b enters the undersurface side of the locking release member catch portion 104f.

The eject lever locking release portion 109 is formed by cutting a part of the cartridge holder 101, or by being formed separately from the cartridge holder 101 to be mounded on the cartridge holder 101.

Next, the operation of the eject lever locking release portion 109 will be explained. As shown in FIG. 1, when the cartridge 1 is inserted in the cartridge holder 101 in the cartridge insertion/ejection position, the portion to be pressed 104c provided at the one end portion of the eject lever 104 is pressed by the front surface of the cartridge 1, and the eject lever 104 turns against the spring force of the eject spring 105 and is locked so as not to be return-turned by the portion to be locked 104e provided at the other end portion of the eject lever 104 being engaged with the eject lever locking portion 108 provided at the chassis 102. In this state, the locking release member catch portion 104f provided in the vicinity of the portion to be locked 104e of the eject lever 104 is positioned approximately just under the eject lever locking release portion 109 provided at the cartridge holder 101 as shown in FIG. 7C.

Next, as shown in FIG. 8A, when the cartridge holder 101 is turned toward the recording/playback position, the inclined surface 109c of the pawl portion 109b of the eject lever locking release portion 109 touches the side surface of the locking release member catch portion 104f of the eject lever 104 and pushed, then, the arm portion 109a is bent and the pawl portion 109b moves in the direction escaping from the side surface of the locking release member catch portion 104f.

Then, when the cartridge holder 101 is moved in the vicinity of the recording/playback position, as shown in FIG. 8B, the engagement between the inclined surface 109c of the pawl portion 109b and the side surface of the locking release member catch portion 104f is released, and the pawl portion 109b is return-moved by the elasticity of the arm portion 109a to be in a state in which the tip portion 109d of the pawl portion 109b enters the undersurface of the locking release member catch portion 104f. In this state, recording/playback of the disc is performed.

When the cartridge holder 101 is turned toward the cartridge insertion/ejection position after finished, as shown in FIG. 8C, the tip portion 109d of the pawl portion 109b of the eject lever locking release portion 109 engages with the undersurface of the locking release member catch portion 104f and the based portion 104a is lifted through the locking release member catch portion 104f, and the lock between the portion to be locked 104e of the eject lever 104 and the eject lever locking portion 108 provided at the chassis 102 is released as shown in FIG. 9B, then, the eject lever 104 turns by the spring force of the eject spring 105 to push the cartridge 1 out from the cartridge holder 101.

(9) Configuration of a Cartridge

Figure 10:
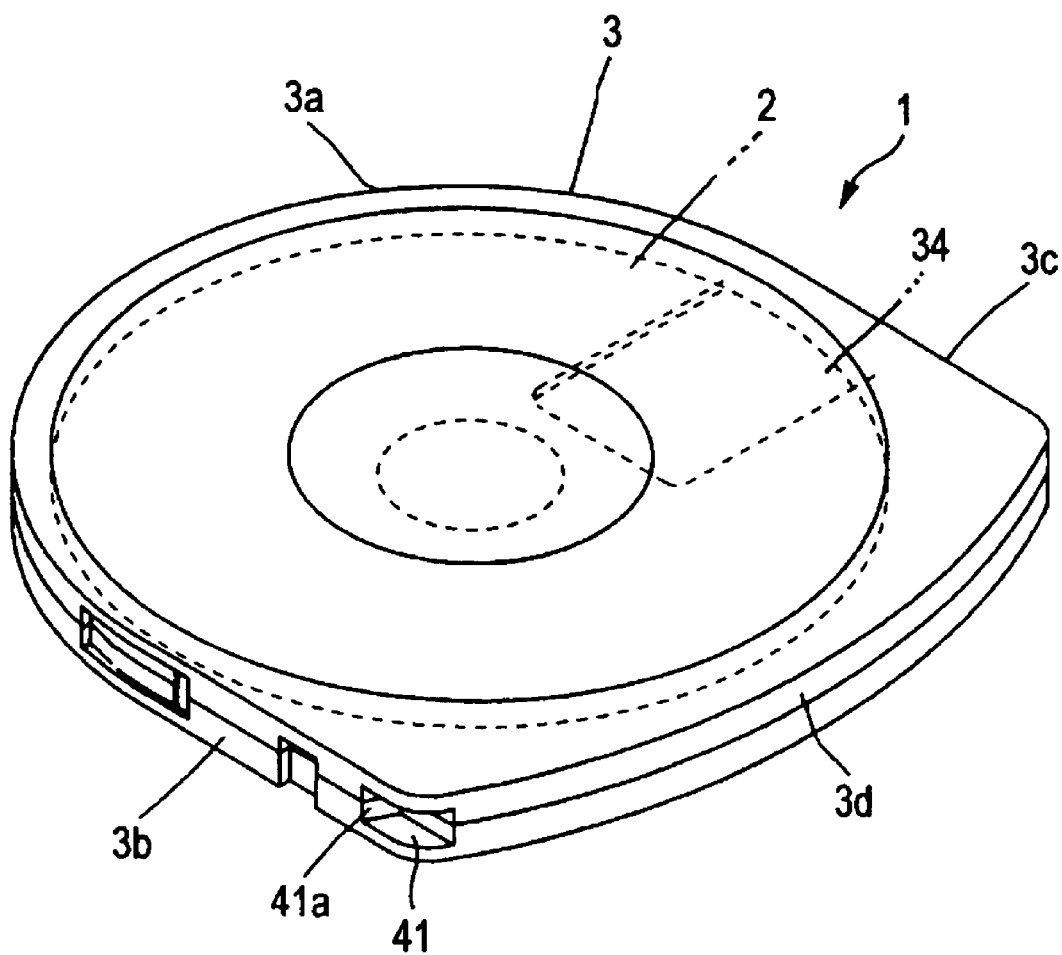
FIG. 10 is a perspective view of a cartridge.
Figure 11:
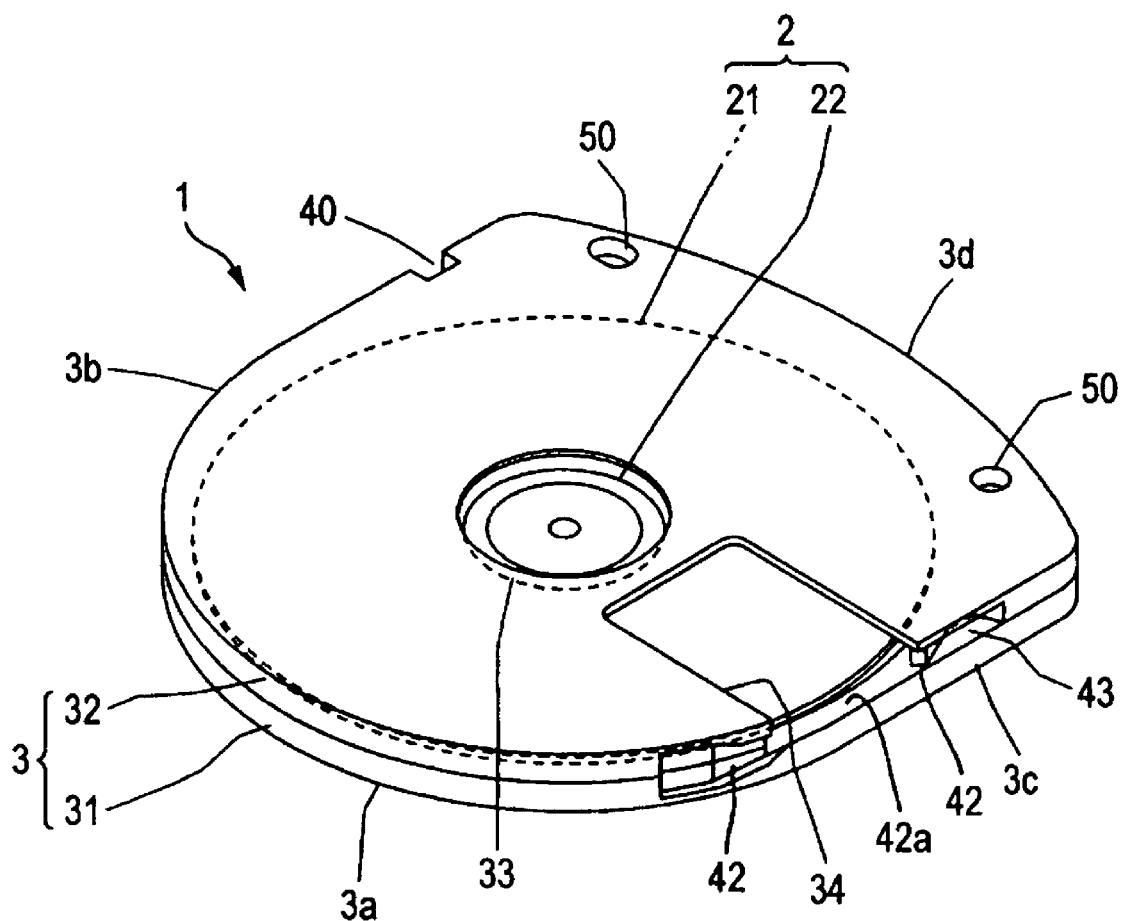
FIG. 11 is a perspective view of the cartridge seen from the bottom side.

FIG. 10 is a perspective view of the cartridge 1 seen from the upper half side and FIG. 11 is a perspective view of the cartridge 1 seen from the lower half side.

The cartridge 1 includes the disc-type recording medium 2 and the cartridge body 3 housing the disc-type recording medium 2 rotatably in a circular disc housing portion and having an opening portion for recording/playback 34 for exposing a part of the disc-type recording medium 2 from outside. The cartridge 1 is constituted as a so-called shutter-less cartridge which does not have a shutter for opening and shutting the opening portion for recording/playback 34.

As shown in FIG. 11, the disc-type recording medium 2 is configured to have the hub 22 for chucking at the center of an optical disc 21 in which game software and the like are recorded. The optical disc 21 is formed to have a small diameter of approximately 50 mm. The hub 22 for chucking is made of magnetic metal such as stainless steel to be attracted by a magnet.

The cartridge body 3 is formed by confronting peripheral walls of upper and lower halves 31, 32 with each other. In the cartridge body 3, the front surface 3a (side surface at an insertion end side to the playback device described later) is formed to be an arc-shaped surface (semicircular surface) having approximately the same curvature radius as the optical disc 21, right and left side surfaces 3b, 3c continued from the front surface 3a are formed to be flat surfaces which are parallel to each other, and a back surface 3d opposed to the front surface 3a is formed to be a curved surface smoothly continued to the right-and-left first and second side surfaces 3b, 3c.

At the center of the lower half 32, an opening portion for driving 33 which exposes the hub 22 of the disc-type recording medium 2 from outside is provided. In addition, the opening portion for recording/playback 34 which exposes an information recording surface as the optical disc 21 of the disc-type recording medium 2 from outside is provided from the vicinity of the opening portion for driving 33 to the second side surface 3c.

As shown in FIG. 10, the cartridge 1 includes a first concave portion for releasing side pressure 41 at the first side surface 3b of the cartridge body 3, which is provided for eliminating side pressure to the cartridge holder 101 due to a cartridge falling prevention member 211 by fitting a convex portion 213 of the cartridge falling prevention member 211 provided at a first side surface plate 101b (refer to FIG. 1) of the cartridge holder 101 which will be described later to the concave portion 41 so that the convex portion 213 is in a non-contact state with respect to the first side surface 3b of the cartridge body 3 of the cartridge 1 when the cartridge 1 is completely housed in the cartridge holder 101.

As shown in FIG. 11, the cartridge 1 includes a guide groove 42 guiding the insertion of the cartridge 1 at the second side surface 3c of the cartridge body 3, in which a convex portion for guiding cartridge insertion 214 provided at the second side surface plate 101c (refer to FIG. 17) of the cartridge holder 101 is inserted to the guide groove 42 when the cartridge 1 is inserted in the cartridge holder 101, and a second concave portion for releasing side pressure 43 for eliminating side pressure to the cartridge holder 101 due to the convex portion for guiding cartridge insertion 214 by fitting the convex portion for guiding cartridge insertion 214 to the concave portion 43 so that the convex portion 214 is in a non-contact state with respect to the second side surface 3c of the cartridge body 3 of the cartridge 1 when the cartridge 1 is completely housed in the cartridge holder 101. In addition, positioning holes 50 to which cartridge positioning reference pins 122 provided at the chassis 102 are fit are provided in the vicinity of the back surface 3d side at the lower surface of the cartridge body 3.

The hub 22 of the disc-type recording medium 2 is magnetically chucked on the disk table of the playback device through the opening portion for driving 33. In addition, recording/playback of information is performed by the optical pickup with respect to the optical disc 21 as the disc-type recording medium 2 through the opening portion for recording/playback 34.

(10) Configuration of the Cartridge Holder

As shown in FIG. 5, the cartridge holder 101 includes an upper surface plate (top surface plate) 101a having an approximately square shape, right-and-left side surface plates (hereinafter, referred to as a first and second side surface plates) formed by folding right-and-left both sides of the upper surface plane 101a downward at approximately right angles, a pair of right-and-left first and second cartridge support portions 101d, 101e formed by folding lower ends of the first and second side surface plates 101b, 101c toward inside at approximately right angles and supporting right-and-left both side portions of the undersurface of the inserted cartridge 1, third and fourth cartridge support portions 101f, 101g having a tongue-piece shape provided at inner side from the second cartridge support portion 101e with a predetermined clearance and surface receiving portions 101h, 101i formed by folding front edges of the first and second cartridge support portions 101d, 101e downward. The upper surface plate 101a, the first and second side surface plates 101b, 101c, the pair of right-and-left cartridge support portions 101d, 101e and the like form an insertion/ejection opening 101n for the cartridge 1 and a housing portion 101p continued from the insertion/ejection opening 101n.

The eject lever locking release portion 109 is provided at a position in the upper surface plate 101a of the cartridge 1 corresponding to the position above the space where the cartridge eject mechanism 107 is arranged.

The eject lever locking release portion 109 is formed by cutting and raising a part of the upper surface plate 101a of the cartridge 1. At the center of the upper surface plate 101a, an opening portion 111 having a hexagonal shape is punching-formed for the purpose of lightening weight and the like. A pair of right-and-left first and second leaf springs 112, 113 are formed at both right-and-left end portions of the opening portion 111 of the upper surface plate 101a approximately in parallel with the cartridge insertion direction by cutting and raising parts of the upper surface plate 101a. Free ends at tips of these first and second leaf springs 112, 113 are bent so as to enter the housing portion 101p, pressing the upper surface of the cartridge 1 inserted in the housing portion 101p to press the cartridge 1 to the first to fourth cartridge support portions 101d to 101g.

At the upper surface plate 101a closer to the front end side than the opening portion 111 of (side of the insertion/ejection opening 101n), a pair of right-and-left first and second leaf springs 114, 115 extending from the central part toward a direction orthogonal to the cartridge insertion direction are formed by cutting and raising parts of the upper surface plate 101a.

Figure 12:
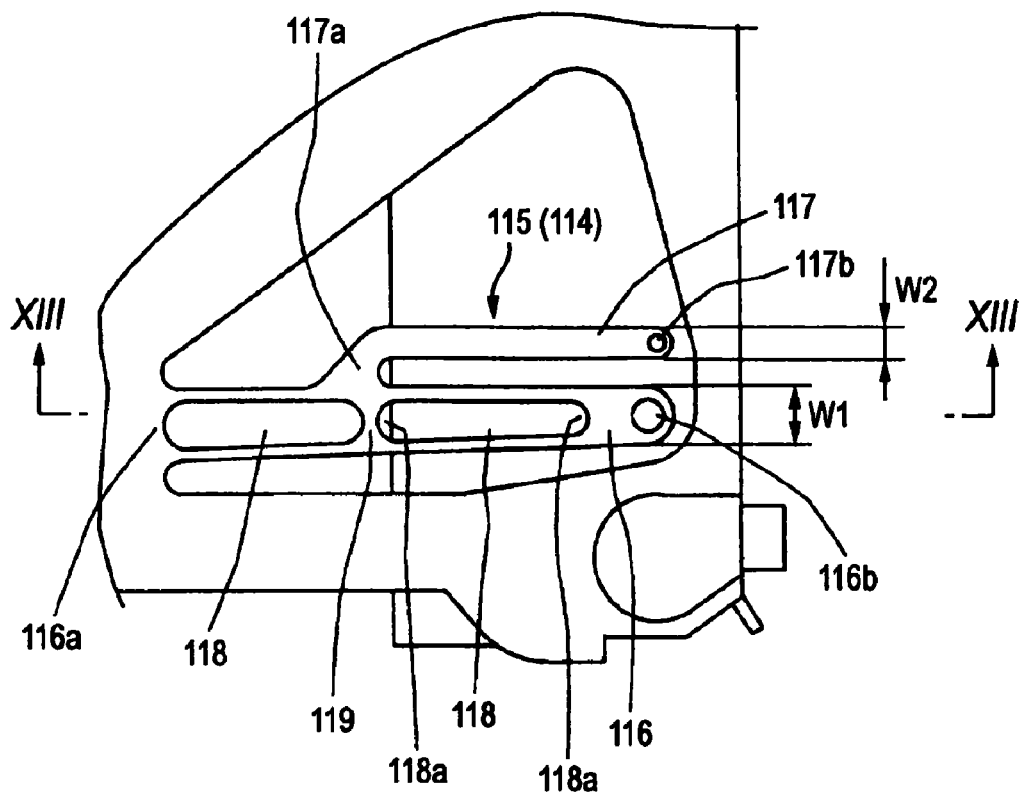
FIG. 12 is an enlarged view of a pop-up spring portion.

As enlarged and shown in FIG. 12, each of the third and fourth leaf springs 114, 115 includes a spring portion for popping up a cabinet cover (hereinafter, referred to as a pop-up spring) 116 having an elongated-plate shape and a spring portion 117 for pressing the cartridge (hereinafter, referred to as a cartridge pressing spring) having an elongated-plate shape separated from one side portion of the hop-up spring 116, extending in parallel with the pop-up spring 116. The width W1 of the pop-up spring 116 is formed to be wider than the width W2 of the cartridge pressing spring 117.

The pop-up spring 116 is formed in a so-called frame shape including a bore portion 118 extending in the longitudinal direction and a beam portion 119 is provided at the bore portion 118. The beam portion 119 is provided at a root portion of the cartridge pressing spring 117, that is, provided in the vicinity of a portion in which the cartridge pressing spring 117 is separated from the pop-up spring 116.

Figure 13:
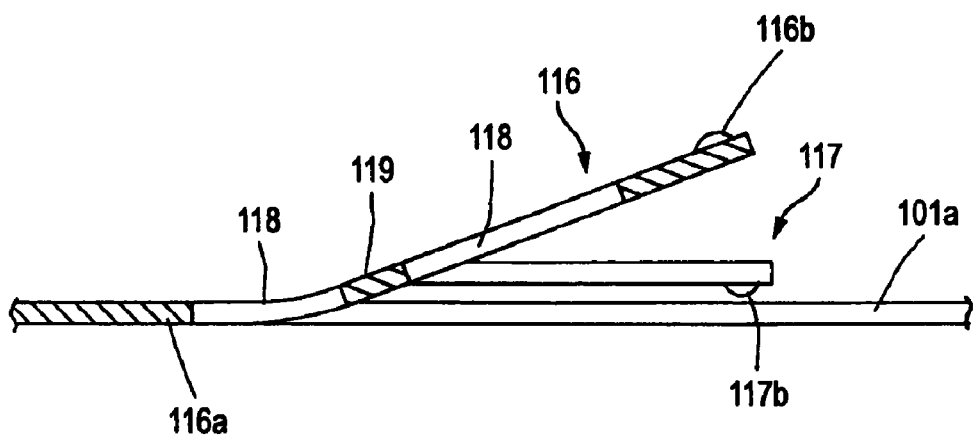
FIG. 13 is a cross-sectional view taken along the line A-A.

A root portion 116a of the pop-up spring 116, a root portion 117a of the cartridge pressing spring 117 and an end portion 118a of the bore portion 118 are formed to have a curved shape, which prevents stress from being concentrated to one point when the pop-up spring 116 or the cartridge pressing spring 117 is bent. As shown in FIG. 13, the pop-up spring 116 is folded at the root portion 116a to be curved gently, which prevents the stress from being concentrated to one point when the pop-up spring 116 is bent. The cartridge pressing spring 117 extends approximately in parallel with the upper surface plate 101a or in parallel with the pop-up spring 116 from the middle of the pop-up spring 116.

Figure 14:
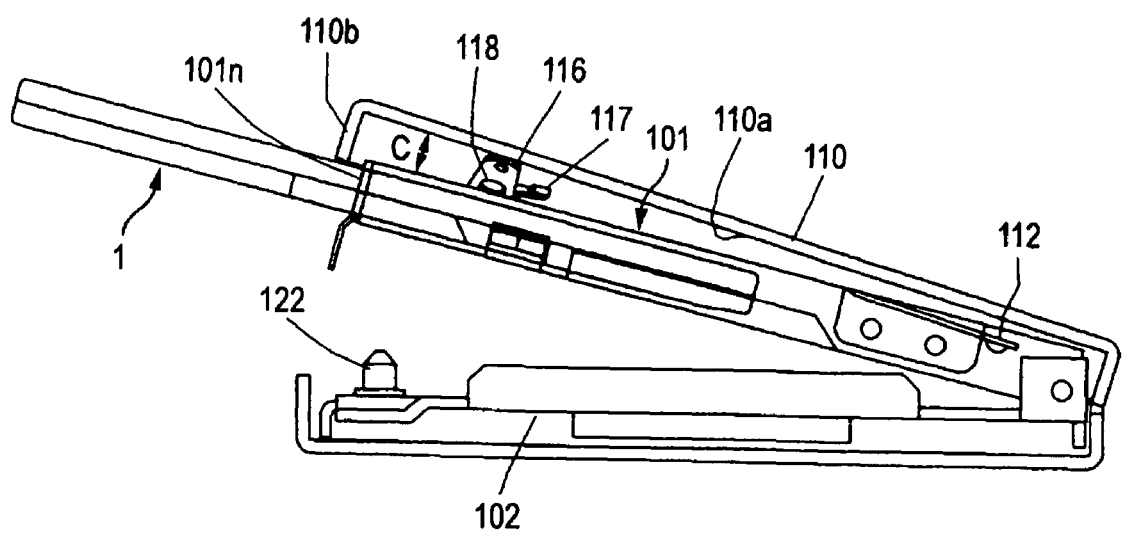
FIG. 14 is a side view showing a state in which a cabinet cover is pushed up by the pop-up spring.
Figure 15:
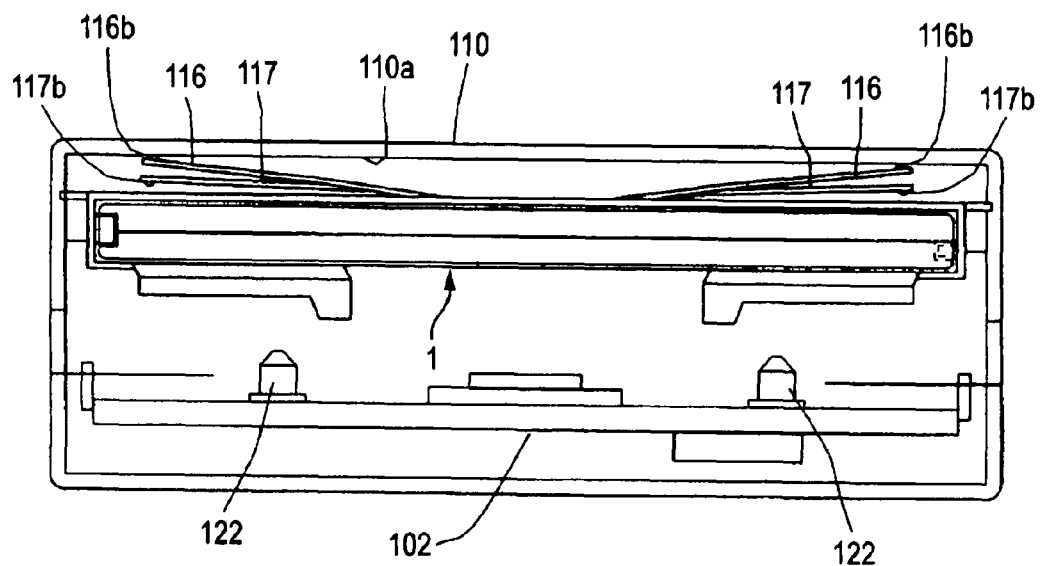
FIG. 15 is a front view showing a state in which the cabinet cover is pushed up by the pop-up spring.

As shown FIG. 14 and FIG. 15, a tip portion 116b of the pop-up spring 116 touches an inner surface 110a of a cabinet cover 110 for turning and moving the cartridge holder between the recording/playback position and the cartridge insertion/ejection position of the cartridge holder 101.

Figure 16:
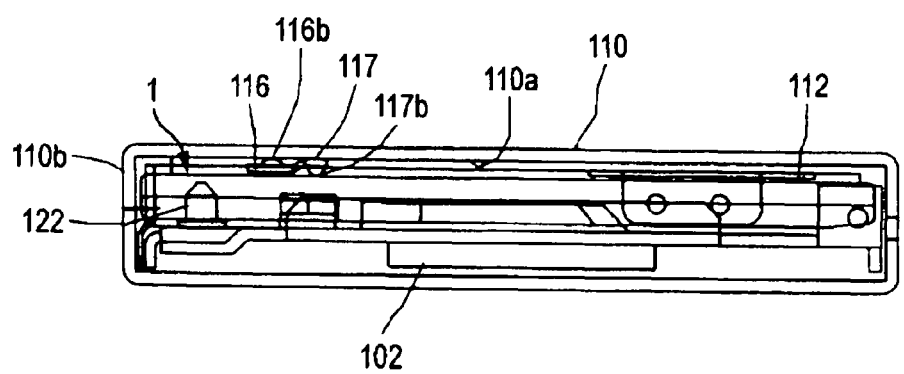
FIG. 16 is a side view showing a state in which the cabinet cover is closed and the pop-up spring is bent.

When the cartridge 1 is inserted into the cartridge holder 101 and the cabinet cover 110 is closed, as shown in FIG. 3, the cartridge holder 101 is moved to the recording/playback position. Then, as shown in FIG. 16, the tip portion 116b of the pop-up spring 116 is pressed by the inner surface 110a of the cabinet cover 110, and the pop-up spring 116 is bent toward the cartridge 1. When the pop-up spring 116 is bent, the tip portion 117a of the cartridge pressing spring 117 branched from the one side of the pop-up spring 116 touches the upper surface of the cartridge 1 and presses the cartridge 1 onto the cartridge supporting portions of the cartridge holder 101. At this time, force in torsion direction acts on the pop-up spring 116 due to reaction force of the cartridge pressing spring 117, however, the force in torsion direction is deconcentrated to the whole region of the pop-up spring 116 by the beam portion 119 and the like provided at the pop-up spring 116, which prevents plastic deformation of the pop-up spring 116 in torsion direction.

As described above, recording/playback is performed in a state in which the cartridge 1 is pressed on the first to fourth cartridge support portions 101d to 101g by spring force according to the tip portions of the first and second leaf springs 112, 113 and the pop-up springs 116 and the cartridge pressing springs 117 of the third and fourth leaf springs 114, 115. When the cabinet cover 110 is opened after finishing recording/playback, the cartridge holder 101 is turned and moved to the cartridge insertion/ejection position. Then, as shown in FIG. 14, a given clearance "C" is formed between the cartridge holder 101 and the cabinet cover 110 by the pop-up springs 116 and closure of the cartridge insertion/ejection opening 101n of the cartridge holder 101 by a front plate 110b of the cabinet cover 110 is released to open the cartridge insertion/ejection opening 101n.

As shown in FIG. 1, the cartridge falling prevention member 211 preventing the cartridge 1 from falling away from the cartridge holder 101 by giving breaking force to the ejection of the cartridge 1 by the eject lever 105 is formed by cutting and raising at the first side surface plate 101b of the cartridge holder 101. The cartridge falling prevention member 211 includes an elastic piece portion 212 stretching toward the cartridge insertion/ejection opening 101n of the cartridge holder 101 and the convex portion 213 provided at a tip portion of the elastic piece portion 212 and making slide contact with the first side surface 3b at the time of ejecting the cartridge. When the cartridge 1 is completely housed in the cartridge holder 101, the convex portion 213 is fit into the first concave portion for releasing side pressure 41 provided at the first side surface 3b of the cartridge 1 to release side pressure in the non-contact state with respect to the side surface 3b.

Figure 17:
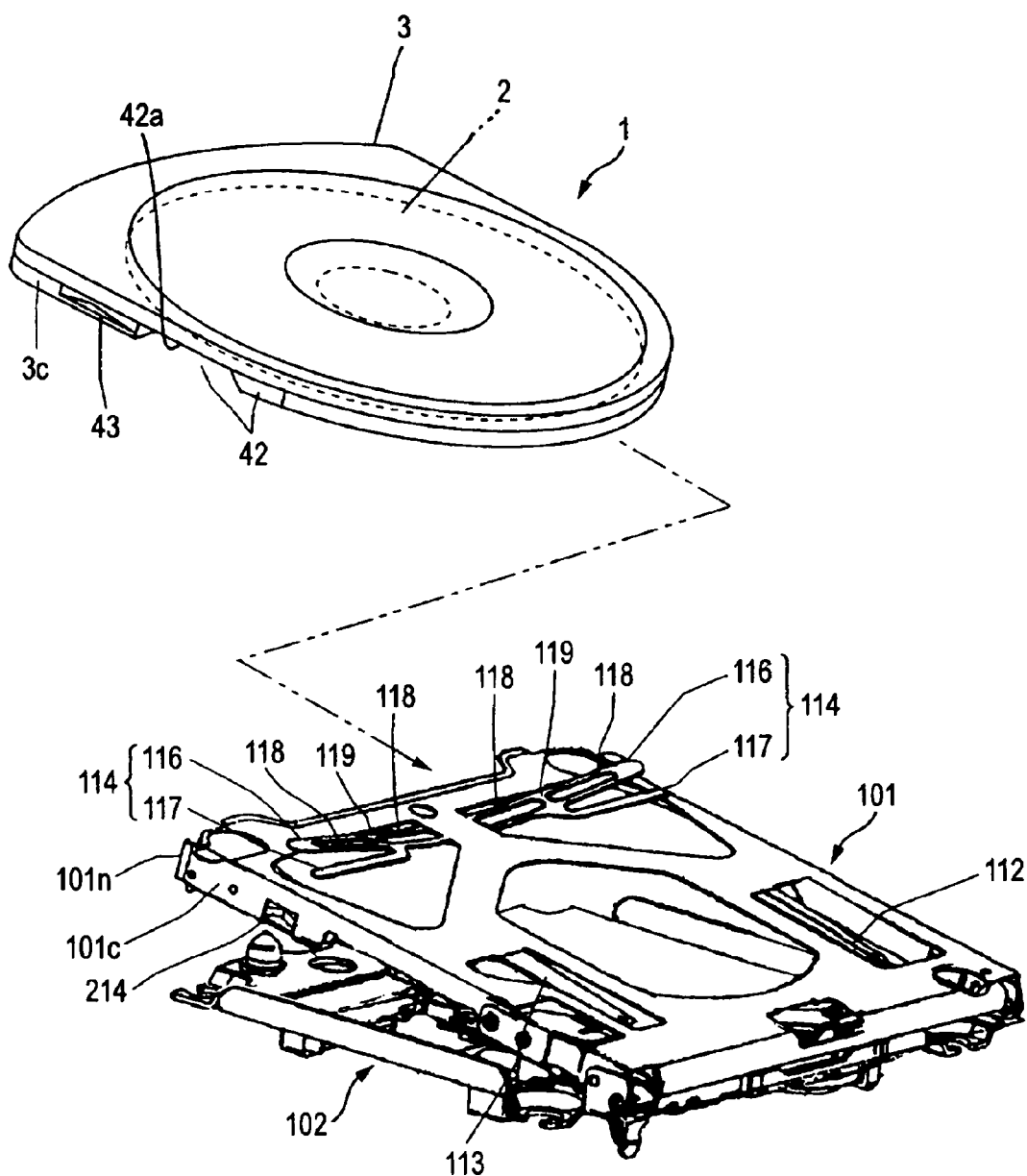
FIG. 17 is a perspective view of a cartridge holder seen from a first side surface in which a convex portion for guiding cartridge insertion is provided.

As shown in FIG. 17, the convex portion for guiding cartridge insertion 214 projecting into the cartridge housing portion 101p is provided at an end portion on the side of the cartridge insertion/ejection opening 101n of the second side surface plate 101c of the cartridge holder 101. The convex portion for guiding cartridge insertion 214 is formed by cutting and raising at an approximately central portion of the cartridge holder 101 in the thickness direction of the second side surface 101c.

As shown in FIG. 17, when the cartridge 1 is inserted in the cartridge holder 101 in the normal posture, the convex portion for guiding cartridge insertion 214 is introduced into the guide groove 42 provided at the one surface side 3c of the cartridge 1. When the cartridge 1 is inserted to the prescribed position, the convex portion for guiding cartridge insertion 214 is placed into the second concave portion for releasing side pressure 43 provided continuously at the tip portion of the guide groove 42 to be in the non-contact state with the cartridge 1.

Figure 18:
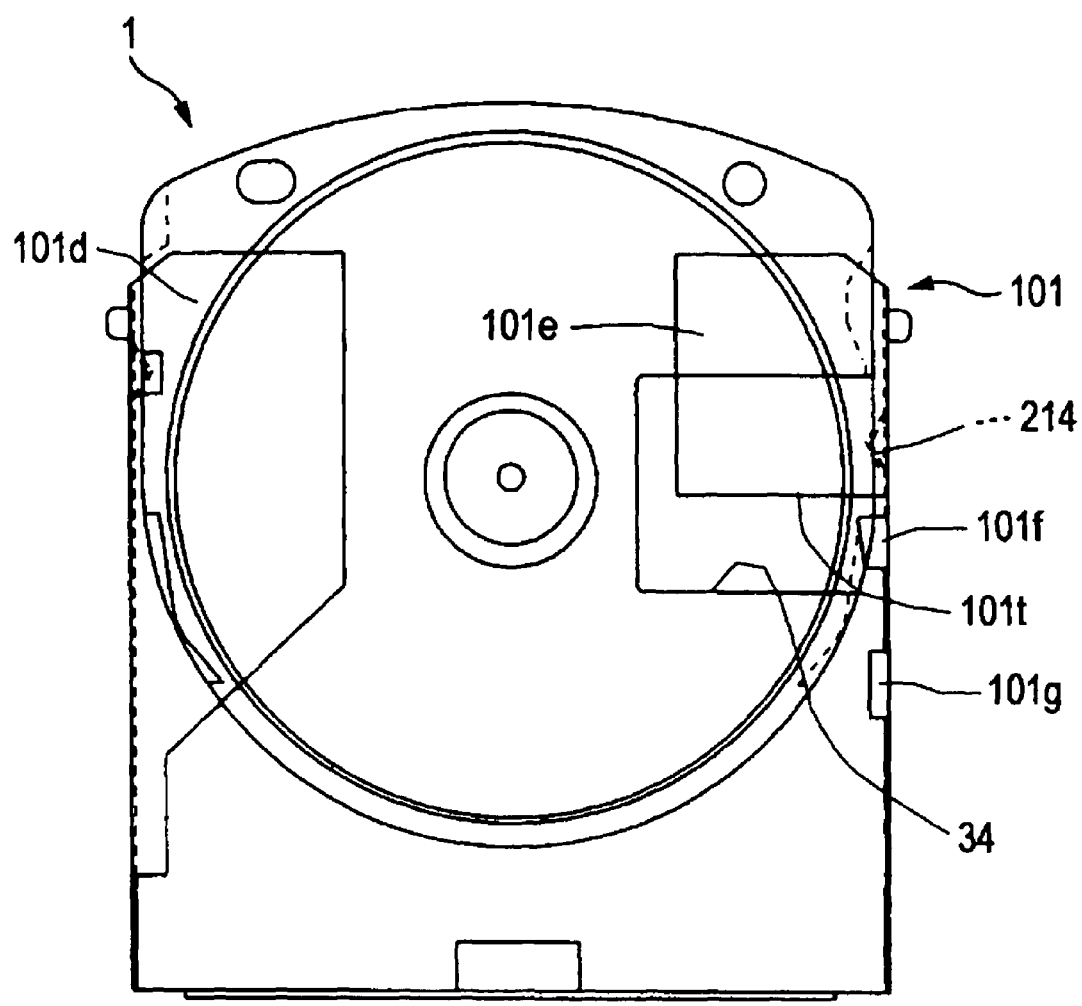
FIG. 18 is a bottom view of the cartridge showing an insertion process of the cartridge.
Figure 19:
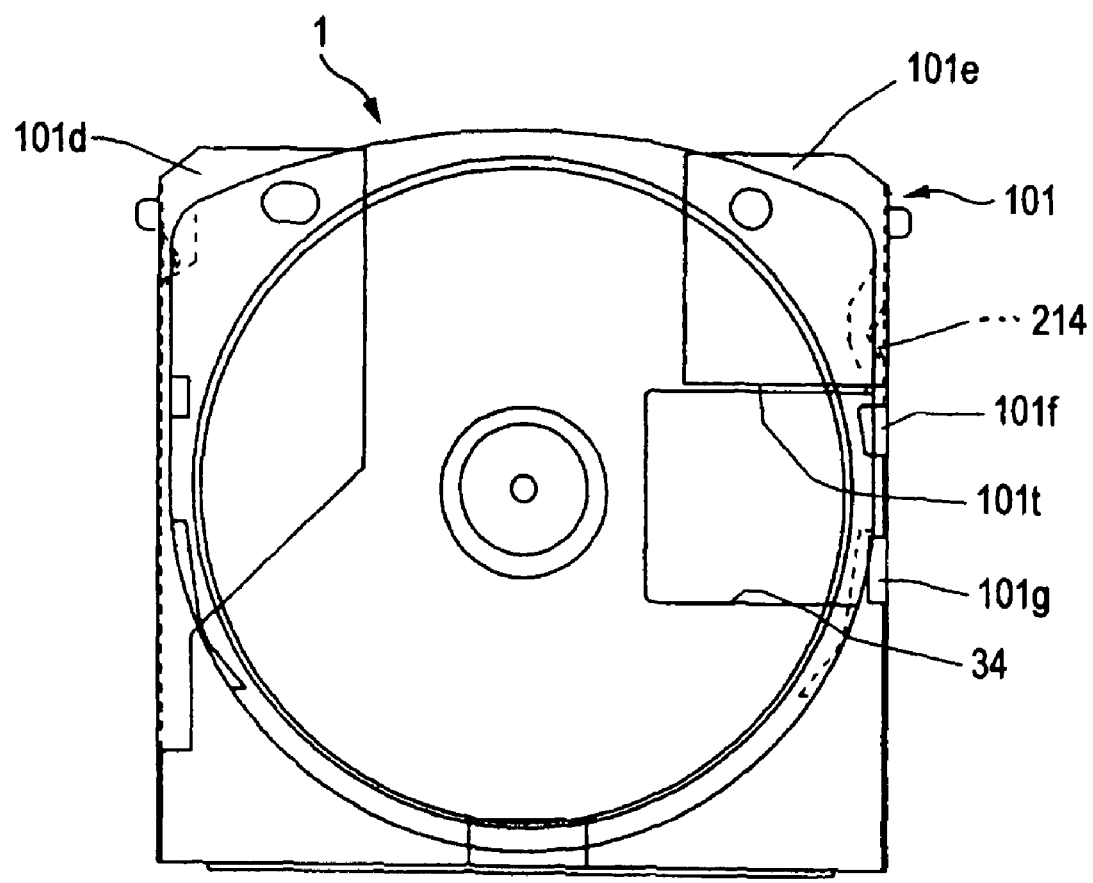
FIG. 19 is a bottom view showing a state in which the cartridge is housed.

The convex portion for guiding cartridge insertion 214 guides the insertion of the cartridge 1 when the cartridge 1 is inserted into the cartridge holder 101, and as shown in FIG. 18, an end portion 101t of the second cartridge support portion 101e, the third cartridge support portion 101f and the like of the cartridge holder 101 enter the opening portion for recording/playback 34 of the cartridge 1 to prevent an information recording surface of the disc-type recording medium from being damaged by the second cartridge support portion 101e and the like.

That is, in the case that the cartridge 1 is the shutterless type one, the opening portion for recording/playback 34 is always opened, therefore, there are fears that the information recording surface of the disc-type recording medium is damaged by the end portion 101t of the second cartridge support portion 101e and the like, or that the outer peripheral surface of the disc-type recording medium in the cartridge 1 runs onto the second cartridge support portion 101e because the end portion 101t of the second cartridge support portion 101e, the third cartridge support portion 101f and the like of the cartridge holder 101 enter the opening portion for recording/playback 34 in the case that strong pressing force is added to the cartridge 1 by some reason when the cartridge 1 is inserted into the cartridge holder 101. The convex portion for guiding cartridge insertion 214 touches an upper surface of the 42a the guide groove 42 and controls movement in the thickness direction of the cartridge 1 to prevent the information recording surface of the disc-type recording medium from being damaged or to prevent the outer peripheral surface of the disc-type recording medium from running onto the third cartridge support portion 101f because the end portion 101t of the second cartridge support portion 101e, the third cartridge support portion 101f and the like of the cartridge holder 101 enter the opening portion for recording/playback 34.

The convex portion for guiding cartridge insertion 214 also acts as an error-insertion prevention member preventing the error insertion of the cartridge 1. That is, in the case that the cartridge 1 is inserted wrong side up, the convex portion for guiding cartridge insertion 214 abuts on the side surface of the cartridge 1 to prevent further insertion of the cartridge 1. In the case that the cartridge 1 is inserted back to front, the convex portion for guiding cartridge insertion 214 abuts on an end surface 41a of the first concave portion for releasing side pressure 41 of the cartridge 1 to prevent further insertion of the cartridge 1. When the convex portion for guiding cartridge insertion 214 is not provided, the error insertion of the cartridge 1 can be prevented by the third cartridge support portion 101f shown in FIG. 5, however, the convex portion for guiding cartridge insertion 214 is provided at the position closer to the cartridge insertion/ejection opening 101n than the third cartridge support portion 101f, therefore, the convex portion 214 can prevent further insertion of the cartridge at an earlier stage when the cartridge is wrongly inserted.

(11) Configuration of the Chassis

As shown in FIG. 5, the chassis 102 is formed in an approximately quadrangle shape by a metal plate. At four corners of the chassis 102, damper mounting portions 131 are provided, and dampers 132 made of rubber are fixed at the damper mounting portions 131. At right-and-left side portions of the chassis 102, right-and-left side walls 133, 134 positioned outside the first and second side surface plates 101b, 101c of the cartridge holder 101 are provided. At end sides of the right-and-left side walls 133, 134, a pair of bearing portions 135, 136 for fixing the cartridge holder 101 so as to be able to turn are provided, and shafts 137, 138 provided inside the bearing portions 135, 136 are inserted into bearing holes 123, 124 of the cartridge holder 101, thereby supporting the cartridge holder 101 so as to be able to turn between the cartridge insertion/ejection position and the recording/playback position.

The chassis 102 includes cartridge positioning reference pins 122 fitted to the positioning holes 50 of the cartridge 1 through positioning pin introducing holes 121 provided at the pair of right-and-left cartridge support portions 101d, 101e of the cartridge holder 101 when the cartridge holder 101 is moved to the recording/playback position.

The chassis 102 includes the eject lever locking portion 108 in the space formed by the front surface 3a of the cartridge 1 housed in the cartridge holder 101, the upper surface of the chassis 102 and the undersurface of the cartridge holder 101. The eject lever locking portion 108 engages with the portion to be locked 104e of the eject lever 104 to lock the eject lever 104 so as not to be return-turned when the eject lever 104 is turned against the eject spring 105 to the position where the cartridge 1 is completely housed in the cartridge holder 101 as shown in FIG. 7A to FIG. 7D.

The eject lever locking portion 108 is formed by providing an oval convex portion at the upper surface of the chassis 102. As shown in FIG. 7D, one end portion 108b of the eject lever locking portion 108 is formed to be an inclined surface so that the portion to be locked 104e of the eject lever 104 climbs over the eject lever locking portion 108. On the other hand, the other end portion 108a of the eject lever locking portion 108 is formed to be an approximately vertical surface so that the portion to be locked 104e of the eject lever 104 engages securely.

The eject lever locking portion 108 releases the engagement with the portion to be locked 104e when the base portion 104a of the eject lever 104 is allowed to be floated from the chassis 102 against spring force of the eject spring 105. The eject lever 104 whose engagement with the eject lever locking portion 108 is released turns with the base portion 104a climbing over the eject lever locking portion 108 to eject the cartridge 1 from the cartridge holder 101.

As shown in FIGS. 7A to 7C, an eject lever floating prevention portion 139 preventing the vicinity of the portion to be pressed 104c of the eject lever 104 from being floated in a state in which the eject lever 104 is locked by the eject lever locking portion 108 is provided at the chassis 102.

(12) Operation and Effect

The thread motor and the playback device 101 have the above configuration, and when the cabinet cover 110 is opened as shown in FIG. 14, the cartridge holder 101 turns following the cabinet cover 110, and moves to the cartridge insertion/ejection position. When the cartridge 1 is inserted in the cartridge holder 101 in the cartridge insertion/ejection position, the center of the front portion 3a of the cartridge body 3 abuts on the portion to be pressed 104c of the eject lever 104 to press the portion to be pressed 104c as described above.

When the portion to be pressed 104c is pressed, the eject lever 104 turns against spring force of the eject spring 105, the cartridge 1 is completely housed in the cartridge holder 101 and the eject lever 104 is locked so as not to be return-turned by the eject lever locking portion 108.

When the cabinet cover 110 is closed after the cartridge 1 is housed in the cartridge holder 101, the cartridge holder 101 moves from the cartridge insertion/ejection position to the recording/playback position, following the cabinet cover 110.

When the cartridge holder 101 moves from the cartridge insertion/ejection position to the recording/playback position, as shown in FIG. 8A, the side surface of the locking release member catch portion 104f of the eject lever 104 touches the inclined surface 109c of the pawl portion 109b of the eject lever locking release portion 109, which bends the arm portion 109a of the eject lever locking release portion 109 and moves the pawl portion 109b in the so-called escape direction. When the contact between the inclined surface 109c and the locking release member catch portion 104f is released, the eject lever locking release portion 109 elastically returns and the pawl portion 109b enters the undersurface side of the locking release member catch portion 104f so as to be engaged with the undersurface thereof as shown in FIG. 8B.

When the cabinet cover 110 is opened after finished, the cartridge holder 101 turns following the cabinet cover 110 to move to the cartridge insertion/ejection position. When the cartridge holder 101 moves from the cartridge insertion/ejection position to the recording/playback position, as shown in FIG. 8C, the locking release member catch portion 104f of the eject lever 104 is lifted by the pawl portion 109b of the eject lever locking release portion 109, and the lock of the eject lever 104 by the eject lever locking portion 108 is released, as a result, the eject lever 104 turns by spring force of the eject spring 105 to push the cartridge 1 out from the cartridge holder 101.

In the playback device according to the embodiment, since the first gear is provided at the outer peripheral surface of the rotor of the thread motor, the thickness of the first gear is absorbed by the height of the rotor, and the height from the chassis to the first gear can be lowered for the thickness of the first gear as compared with the case in which the first gear is provided at the undersurface of the rotor as in related arts, as well as the thickness of the transmission gear group including the first gear can be lowered for the thickness of the first gear to enable the transmission gear group to be arranged in one plane. In addition, since the first gear is provided at the outer peripheral surface of the rotor of the thread motor and the flange portion opposed to the first gear is provided with a predetermined clearance, when the tip portion of the motor falling prevention portion is inserted to the clearance between the output gear and the flange portion and the thread motor moves to the falling direction away from the chassis, the tip portion touches the flange portion to prevent further movement of the thread motor, which prevents the thread motor from falling from the chassis.

(13) Other Embodiments

In the above embodiment, the case in which the flange portion 200 is formed by folding the tip portion of the rotor 197 at the opening side at approximately right angles toward the outside was shown, however, it is also preferable that the flange portion is formed at the outer surface of the rotor 197 by synthetic resin and the like having the same material as the first gear 201 using the outsert molding and the like. The flange portion can be slightly lightened in the case in which the flange portion 200 is formed of resin as compared with the case in which the flange portion is formed by folding the tip portion of the rotor 197 made of metal at the opening side at right angles toward the outside. It is also preferable to form the flange portion 200 integrally with the ring-shaped first gear 201. In the above embodiment, the case was shown, in which the ring-shaped first gear 201 is provided at the outer peripheral surface of the end portion of the cylindrical portion 197a of the rotor 197 at the side of the bottom surface portion 197b, which is formed in the cylindrical shape having the bottom and the flange portion 200 opposed to the ring-shaped gear 201 at a predetermined clearance at the end portion which is the opposite side of the bottom surface portion 197b of the cylindrical portion 197a is provided, however, it is not always necessary that the ring-shaped first gear 201 is provided at the end portion at the side of the bottom surface portion 197b of the cylindrical portion 197a, and preferable that the gear 201 is provided at the center of the cylindrical portion 197a and the like depending on the circumstances.

It should be understood by those skilled in the art that various modifications, combinations, sub-combinations and alterations may occur depending on design requirements and other factors insofar as they are within the scope of the appended claims or the equivalents thereof.

What is claimed is:

1. A playback device, comprising:
   a chassis;
   a thread motor provided at the chassis;
   a transmission gear group transmitting power of the thread motor to a playback portion; and a motor falling prevention portion provided at the chassis and preventing the thread motor from falling away from the chassis;

wherein the thread motor includes a first gear and a flange portion at an outer peripheral surface of a cylindrical rotor, and the first gear and the flange portion are arranged so as to be opposed to each other with a predetermined clearance; and wherein the motor falling prevention portion prevents a falling of the thread motor by a tip portion thereof touching the flange portion when the thread motor moves in a falling direction away from the chassis;

wherein the transmission gear group includes:

a second gear engaging with the first gear provided at the outer peripheral surface of the thread motor, a third gear which is coaxial with the second gear and arranged between the chassis and the second gear, a fourth gear engaging with the third gear, a fifth gear engaging with the fourth gear, and the second gear is a flat-plate gear, the third gear is a first worm gear, the fourth gear is a shaft-shaped worm gear and the fifth gear is a second worm gear wherein, in the fourth gear, one end side and another end side have reverse threads, taking an approximate center of the fourth gear in a longitudinal direction as a boundary, one end side engages with the third gear and the other end side engages with the fifth gear.

2. The playback device according to claim 1, wherein the fourth gear changes speed reduction ratio at the one end side and at the other end side.

3. The playback device according to claim 1, wherein the thread motor comprises a ring-shaped gear formed at a cylindrical portion of the cylindrical rotor by outsert molding.

4. The playback device according to claim 1, wherein the flange portion is formed by folding an end portion at an opening side of a cylindrical portion of the cylindrical rotor toward an outside at approximately right angles.

5. The playback device according to claim 1, wherein the flange portion is formed at a cylindrical portion of the cylindrical rotor by outsert molding.

6. The playback device according to claim 1, wherein the motor falling prevention portion is formed by cutting at the chassis.

7. The playback device according to claim 1, wherein the motor falling prevention portion is formed at the chassis by outsert molding.

8. The playback device according to claim 1, wherein the motor falling prevention portion is one of a plurality of motor falling prevention portions.

* * * * *